US007944559B2

(12) United States Patent
Oskotsky et al.

(10) Patent No.: US 7,944,559 B2
(45) Date of Patent: May 17, 2011

(54) AIRBORNE HYPERSPECTRAL IMAGING SYSTEM

(75) Inventors: Mark Oskotsky, Mamaroneck, NY (US); Michael J. Russo, Jr., Roslyn, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 169 days.

(21) Appl. No.: 12/381,785

(22) Filed: Mar. 17, 2009

(65) Prior Publication Data
US 2010/0238440 A1 Sep. 23, 2010

(51) Int. Cl.
*G01J 3/28* (2006.01)
(52) U.S. Cl. ........................................................ 356/328
(58) Field of Classification Search .................. 356/326, 356/328
See application file for complete search history.

(56) References Cited

U.S. PATENT DOCUMENTS

| | | | |
|---|---|---|---|
| 5,880,834 A | | 3/1999 | Chrisp |
| 6,100,974 A | * | 8/2000 | Reininger .................. 356/300 |

OTHER PUBLICATIONS

X. Prieto-Blanco, et al., Analytical design of an Offner imaging spectrometer, Optics Express, v. 14, No. 20 (Oct. 2006) at pp. 9156-9168.
F. Reininger, Optics for Compact, High Performance Imaging Spectrometers, Caltech/NASA JPL, <http://m3.jpl.nasa.gov/docs/Offner_spectrometer.pdf>.
C. Simi, et al, Compact Airborne Spectral Sensor (COMPASS), Proc. of SPIE, v. 4381 (2001) at pp. 129-136.
J. Yiquan, et al, Compact hyperspectral imaging system with a convex grating, Proc. of SPIE, v. 6834, 68340Y (2007) at pp. 1-9.

* cited by examiner

*Primary Examiner* — Tarifur Chowdhury
*Assistant Examiner* — Abdullah Nur
(74) *Attorney, Agent, or Firm* — Leo Zucker

(57) ABSTRACT

A hyperspectral imaging system has fore-optics including primary, secondary and tertiary fore-optics mirrors, and an imaging spectrometer including primary, secondary and tertiary spectrometer mirrors. Light from a distant object is collected by the primary fore-optics mirror, and the tertiary fore-optics mirror forms an intermediate object image at an entrance side of a spectrometer slit. The spectrometer mirrors are configured so that light from an exit side of the slit is diffracted by a grating on the secondary mirror, and an image representing spectral and spatial components of the object is formed by the tertiary spectrometer mirror on a focal plane array. The surface of each mirror of the fore-optics and the spectrometer has an associated axis of symmetry. The mirrors are aligned so that their associated axes coincide to define a common system axis, thus making the imaging system easier to assemble and align in relation to prior systems.

19 Claims, 25 Drawing Sheets

PRESCRIPTION - FOLDED EMBODIMENT 3

```
       RDY         THI   RMD    GLA       CCY THC GLC
> OBJ: INFINITY    INFINITY                100 100
   1:  INFINITY    0.000000 REFL           100 100
    XDE: 0.000000 YDE: 0.000000 ZDE: 0.000000 BEN
    XDC: 100      YDC: 100     ZDC: 100
    ADE: 0.000000 BDE: 0.000000 CDE: 0.000000
    ADC: 100      BDC: 100     CDC: 100

2:  INFINITY    -5.000000                100 100
   3:  INFINITY    12.000000 REFL           100 100
    XDE: 0.000000 YDE: 0.000000 ZDE: 0.000000 BEN
    XDC: 100      YDC: 100     ZDC: 100
    ADE: -25.000000 BDE: 0.000000 CDE: 0.000000
    ADC: 100      BDC: 100     CDC: 100
    XOD: 0.000000 YOD: 3.206990 ZOD: 0.000000
    XOC: 100      YOC: 100     ZOC: 100

4:  -13.04710   -3.427812 REFL           100 100
    CON:
    K : -1.557099 KC : 100
    XDE: 0.000000 YDE: 0.000000 ZDE: 0.000000
    XDC: 100      YDC: 100     ZDC: 100
    ADE: 14.392253 BDE: 0.000000 CDE: 0.000000
    ADC: 100      BDC: 100     CDC: 100

5:  -3.68570    3.427812 REFL            100 PIK
    CON:
    K : 0.678357  KC : 100

6:  -5.32210    -1.800000 REFL           100 100
    CON:
    K : 0.235542  KC : 100

7:  INFINITY    2.164773 REFL            100 100
    XDE: 0.000000 YDE: 0.000000 ZDE: 0.000000 BEN
    XDC: 100      YDC: 100     ZDC: 100
    ADE: -50.000000 BDE: 0.000000 CDE: 0.000000
    ADC: 100      BDC: 100     CDC: 100

8:  INFINITY    2.000000                 100 100
    SLB: "SLIT"
```

FIG. 15A

```
 9:     INFINITY    -5.035227 REFL           100  100
  XDE: 0.000000 YDE: 0.000000 ZDE: 0.000000 BEN
  XDC:  100    YDC:  100    ZDC:  100
  ADE: -45.000000 BDE: 0.000000 CDE: 0.000000
  ADC:  100    BDC:  100    CDC:  100

10:     8.57097    4.943909 REFL            100  100
  SLB: "OFFNER M1"
  CON:
  K :  0.133644  KC :   100

STO:    5.73063    -4.943909 REFL           100  PIK
  SLB: "OFFNER GRATING"
  CON:
  K :  1.299072  KC :   100
  GRT:
  GRO: 1.000000 GRS: 0.000920
  ROC:  100    RSC:  100
  GRX: 0.000000 GRY: 1.000000 GRZ: 0.000000
  RXC:  100    RYC:  100    RZC:  100
               BLT: IDEAL

12:     8.63239    4.354840 REFL            100  100
  SLB: "OFFNER M3"
  CON:
  K :  0.133644  KC :   PIK

13:     INFINITY   -3.000000 REFL           100  100
  XDE: 0.000000 YDE: 0.000000 ZDE: 0.000000 BEN
  XDC:  100    YDC:  100    ZDC:  100
  ADE: -52.000000 BDE: -0.000000 CDE: -0.000000
  ADC:  100    BDC:  100    CDC:  100

IMG:    INFINITY    0.000000                100  100
  SLB: "Image Plane"
  XDE: 0.000000 YDE: 0.000000 ZDE: 0.000000 DAR
  XDC:  100    YDC:  100    ZDC:  100
  ADE: 4.490552 BDE: 0.000000 CDE: 0.000000
  ADC:   0     BDC:  100    CDC:  100
```

FIG. 15B

SPECIFICATION DATA

| | | | | | |
|---|---|---|---|---|---|
| FNO | 2.35000 | | | | |
| DIM | IN | | | | |
| WL | 2400.00 | 1800.00 | 1200.00 | 400.00 | |
| REF | 1 | | | | |
| WTW | 1 | 0 | 0 | 0 | |
| | | | | | |
| XAN | 0.00000 | 1.20000 | 2.35000 | -1.20000 | -2.35000 |
| YAN | 0.00000 | 0.00000 | 0.00000 | 0.00000 | 0.00000 |
| WTF | 6.00000 | 6.00000 | 6.00000 | 6.00000 | 6.00000 |
| VUX | 0.00000 | 0.00000 | 0.00000 | 0.00000 | 0.00000 |
| VLX | 0.00000 | 0.00000 | 0.00000 | 0.00000 | 0.00000 |
| VUY | 0.00000 | 0.00000 | 0.00000 | 0.00000 | 0.00000 |
| VLY | 0.00000 | 0.00000 | 0.00000 | 0.00000 | 0.00000 |
| POL | N | | | | |

APERTURE DATA/EDGE DEFINITIONS

| | |
|---|---|
| CA APE | |
| REX S1 | 2.236644 |
| REY S1 | 1.064640 |
| ADY S1 | 3.209242 |
| REX S2 | 2.236644 |
| REY S2 | 1.064640 |
| ADY S2 | 3.209242 |
| REX S3 | 2.038036 |
| REY S3 | 2.519152 |
| ADY S3 | 3.212319 |
| REX S4 | 1.596883 |
| REY S4 | 1.179136 |
| ADY S4 | 3.443439 |
| REX S5 | 0.571877 |
| REY S5 | 0.473726 |
| ADY S5 | 0.563467 |
| REX S6 | 0.966779 |
| REY S6 | 0.814058 |
| ADY S6 | -0.955167 |
| REX S7 | 0.359848 |
| REY S7 | 0.289214 |
| ADY S7 | -1.763538 |
| REX S8 | 0.203496 |
| REY S8 | 0.001583 |
| ADY S8 | -1.226426 |

FIG. 15C

| | |
|---|---|
| REX S9 | 0.368616 |
| REY S9 | 0.213532 |
| ADY S9 | -1.750484 |
| REX S10 | 1.689053 |
| REY S10 | 1.412459 |
| ADY S10 | -1.528335 |
| CIR S11 | 0.801422 |
| ADY S11 | -0.000003 |
| CIR S12 | 1.848499 |
| ADY S12 | 1.851113 |
| REX S13 | 0.511581 |
| REY S13 | 0.678060 |
| ADY S13 | 2.316375 |
| REX S14 | 0.210000 |
| REY S14 | 0.180000 |
| ADY S14 | 1.460000 |

No refractive materials defined in system

No solves defined in system

PICKUPS
  PIK THI S8 Z2 THI S8 Z1
  PIK THI S8 Z3 THI S8 Z1
  PIK THI S8 Z4 THI S8 Z1
  PIK THI S11 Z1 THI S10 Z1 -1.000000
  PIK K   S12 Z1 K   S10 Z1
  PIK THI S5 Z1 THI S4 Z1 -1.000000

ZOOM DATA

| | POS 1 | POS 2 | POS 3 | POS 4 | POS 5 | POS 6 | POS 7 |
| | POS 8 | POS 9 | POS10 | POS11 | POS12 | | |
|---|---|---|---|---|---|---|---|
| WTW W1 | 1 | 0 | 0 | 0 | 1 | 0 | 0 |
| | 0 | 1 | 0 | 0 | 0 | | |
| WTW W2 | 0 | 1 | 0 | 0 | 0 | 1 | 0 |
| | 0 | 0 | 1 | 0 | 0 | | |
| WTW W3 | 0 | 0 | 1 | 0 | 0 | 0 | 1 |
| | 0 | 0 | 0 | 1 | 0 | | |
| WTW W4 | 0 | 0 | 0 | 1 | 0 | 0 | 0 |
| | 1 | 0 | 0 | 0 | 1 | | |
| FOC | 14 | 14 | 14 | 14 | 14 | 14 | 14 |
| | 14 | 14 | 14 | 14 | 14 | | |
| STO | 11 | 11 | 11 | 11 | 11 | 11 | 11 |
| | 11 | 11 | 11 | 11 | 11 | | |

FIG. 15D

| REF | 1 | 2 | 3 | 4 | 1 | 2 | 3 |
|---|---|---|---|---|---|---|---|
| | 4 | 1 | 2 | 3 | 4 | | |
| WTF F1 | 6.00000 | 3.00000 | 3.00000 | 3.00000 | 3.00000 | 3.00000 | 3.00000 |
| | 3.00000 | 3.00000 | 3.00000 | 3.00000 | 3.00000 | | |
| WTF F2 | 6.00000 | 3.00000 | 3.00000 | 3.00000 | 3.00000 | 3.00000 | 3.00000 |
| | 3.00000 | 3.00000 | 3.00000 | 3.00000 | 3.00000 | | |
| WTF F3 | 6.00000 | 3.00000 | 3.00000 | 3.00000 | 3.00000 | 3.00000 | 3.00000 |
| | 3.00000 | 3.00000 | 3.00000 | 3.00000 | 3.00000 | | |
| WTF F4 | 6.00000 | 3.00000 | 3.00000 | 3.00000 | 3.00000 | 3.00000 | 3.00000 |
| | 3.00000 | 3.00000 | 3.00000 | 3.00000 | 3.00000 | | |
| WTF F5 | 6.00000 | 3.00000 | 3.00000 | 3.00000 | 3.00000 | 3.00000 | 3.00000 |
| | 3.00000 | 3.00000 | 3.00000 | 3.00000 | 3.00000 | | |
| ADE S3 | -25.00000 | -25.00000 | -25.00000 | -25.00000 | -45.00000 | -45.00000 | -45.00000 |
| | -45.00000 | -65.00000 | -65.00000 | -65.00000 | -65.00000 | | |
| ADC S3 | 100 | 100 | 100 | 100 | 100 | 100 | 100 |
| | 100 | 100 | 100 | 100 | 100 | | |
| THI S8 | 2.00000 | 2.00000 | 2.00000 | 2.00000 | 2.00000 | 2.00000 | 2.00000 |
| | 2.00000 | 2.00000 | 2.00000 | 2.00000 | 2.00000 | | |
| THC S8 | 100 | PIK | PIK | PIK | 100 | 100 | 100 |
| | 100 | 100 | 100 | 100 | 100 | | |

POS 1  POS 2  POS 3  POS 4  POS 5  POS 6  POS 7
POS 8  POS 9  POS 10  POS 11  POS 12

INFINITE CONJUGATES

EFL    4.8000  4.8000  4.8000  4.8000  4.8000  4.8000  4.8000
       4.8000  4.8000  4.8000  4.8000  4.8000

BFL    -3.0452 -3.0452 -3.0452 -3.0452 -3.0452 -3.0452 -3.0452
       -3.0452 -3.0452 -3.0452 -3.0452 -3.0452

FFL    28.9189 28.9189 28.9189 28.9189 28.9189 28.9189 28.9189
       28.9189 28.9189 28.9189 28.9189 28.9189

FNO    -2.3500 -2.3500 -2.3500 -2.3500 -2.3500 -2.3500 -2.3500
       -2.3500 -2.3500 -2.3500 -2.3500 -2.3500

FIG. 15E

IMG DIS  -3.0000  -3.0000  -3.0000  -3.0000  -3.0000  -3.0000  -3.0000
         -3.0000  -3.0000  -3.0000  -3.0000  -3.0000

OAL      5.9737   5.9737   5.9737   5.9737   4.1490   4.1490   4.1490
         4.1490   2.8713   2.8713   2.8713   2.8713

PARAXIAL IMAGE

HT       0.0000   0.0000   0.0000   0.0000   0.0000   0.0000   0.0000
         0.0000   0.0000   0.0000   0.0000   0.0000

ANG      0.0000   0.0000   0.0000   0.0000   0.0000   0.0000   0.0000
         0.0000   0.0000   0.0000   0.0000   0.0000

ENTRANCE PUPIL

DIA      2.0426   2.0426   2.0426   2.0426   2.0426   2.0426   2.0426
         2.0426   2.0426   2.0426   2.0426   2.0426

THI     28.0526  28.0526  28.0526  28.0526  28.0526  28.0526  28.0526
        28.0526  28.0526  28.0526  28.0526  28.0526

EXIT PUPIL

DIA     11.3168  11.3168  11.3168  11.3168  11.3168  11.3168  11.3168
        11.3168  11.3168  11.3168  11.3168  11.3168

THI    -29.6396 -29.6396 -29.6396 -29.6396 -29.6396 -29.6396 -29.6396
       -29.6396 -29.6396 -29.6396 -29.6396 -29.6396

STO DIA  1.6028   1.6028   1.6028   1.6028   1.6028   1.6028   1.6028
         1.6028   1.6028   1.6028   1.6028   1.6028

FIG. 15F

AIRBORNE HYPERSPECTRAL IMAGING SYSTEM

BACKGROUND OF THE INVENTION

1. Field of the Invention

The present invention relates to imaging systems, and particularly to hyperspectral imaging systems suitable for airborne deployment.

2. Discussion of the Known Art

Because of security concerns, there is an increasing demand for systems capable of remotely detecting potentially dangerous objects such as explosives or toxins from a safe distance. Airborne hyperspectral imaging systems can be used to determine the composition of these and other objects as well as their physical properties. Such systems combine two-dimensional image sensing technology with a hyperspectral dispersing technique to provide a three-dimensional remote sensing capability. Emitted or reflected light or electromagnetic radiation is collected from the object through optics of the system, and is separated into spectral components or wavelength bands. Because the spectral components are typically unique to the material or element of which the object is composed, various properties of the object may be determined and the object identified by analyzing the separated spectral components. Hyperspectral data sets usually contain many contiguous bands of high spectral resolution over a region of the electromagnetic spectrum. See generally, X. Prieto-Blanco, et al., "Analytical design of an Offner imaging spectrometer", Optics Express, vol. 14, no. 20 (October 2006), at pages 9156-68 and incorporated by reference; and F. Reininger, Caltech/NASA JPL, "Optics for Compact, High-Performance Imaging Spectrometers", at <http://m3.jpl.nasa.gov/docs/Offner_spectrometer.pdf>.

U.S. Pat. No. 5,880,834 (Mar. 9, 1999) discloses an imaging system having fore-optics in the form of a three-mirror anastigmatic telescope (TMA), and an imaging Offner spectrometer. The fore-optics forms an intermediate image at a slit before the spectrometer. An off-axis primary spectrometer mirror delivers radiation onto a secondary spectrometer mirror/diffraction grating, and a tertiary spectrometer mirror reflects light from the grating to form multi-spectral images on a detector surface. Further, U.S. Pat. No. 6,100,974 (Aug. 8, 2000) discloses an imaging system including fore-optics also in the form of a TMA, and a dispersive Offner spectrometer consisting of three mirrors decentered with respect to one another. All relevant portions of the mentioned '834 and '974 U.S. patents are incorporated by reference.

Another imaging spectrometer is described in an article by C. Simi, et al., "Compact Airborne Spectral Sensor (COMPASS)", Proc. of SPIE, vol. 4381 (2001), at pages 129-36. The COMPASS system is comprised of fore-optics in a form of a three-mirror anastigmat, and an Offner spectrometer with a single or dual blaze grating etched on a curved surface. The system is disclosed as being compact, off-axis, and able to deliver 256 spectral channels while having an F-number of 2.5.

Yet another imaging spectrometer is described in an article by J. Yiquan, et al., "Compact hyperspectral imaging system with a convex grating", Proc. of SPIE, vol. 6834, 68340Y (2007), at pages 1-9. The system includes a three mirror anastigmat telescope and an Offner imaging spectrometer with a convex diffraction grating. As disclosed, the system is relatively large, has an F-number of 2.5, and delivers modest performance. All relevant portions of the Simi, et al. and the Yiquan, et al. articles are incorporated by reference.

The known hyperspectral imaging systems have certain significant drawbacks when deployed in airborne and/or military applications, however. For example, optical components of the fore-optics and/or components of the imaging spectrometer must define certain decentrations or tilts relative to one another to obtain correct optical alignment. The tilts and decentrations are highly sensitive to minor variations from predetermined values. Thus, the assembly, alignment, and testing of the systems is difficult, time consuming, and costly. Some of the systems also have a relatively high F-number, tending to reduce system sensitivity and, therefore, mission capability. Moreover, their optics may have a relatively small field of view (FOV), thereby reducing target coverage and/or requiring faster scanning.

Accordingly, there is a need for a high performance hyperspectral imaging system that is compact, provides good performance with a fast (low) F-number, and is easier to fabricate, align and test than existing systems.

SUMMARY OF THE INVENTION

According to the invention, a hyperspectral imaging system includes fore-optics mounted in a system housing, and which is comprised of a primary fore-optics mirror, a secondary fore-optics mirror and a tertiary fore-optics mirror, wherein each of the mirrors has an associated reflective surface. The fore-optics mirrors are configured so that electromagnetic radiation or light from a distant object is collected on the surface of the primary mirror and directed toward the surface of the secondary mirror. The secondary mirror directs the light toward the surface of the tertiary mirror, and the tertiary mirror forms an intermediate image corresponding to the object at an entrance side of a spectrometer slit.

The imaging system also includes an imaging spectrometer mounted in the housing and which is comprised of a primary spectrometer mirror, a secondary spectrometer mirror and a tertiary spectrometer mirror each of which has an associated reflective surface. The primary spectrometer mirror is disposed in operative relation to an exit side of the spectrometer slit, and the secondary spectrometer mirror has an associated diffraction grating. The spectrometer mirrors are configured so that light from the exit side of the spectrometer slit is incident on the surface of the primary mirror and directed toward the diffraction grating of the secondary mirror, diffracted light from the grating is incident on the surface of the tertiary mirror, and the tertiary mirror forms a final spatial and spectral image of the object on a focal plane array mounted in the housing.

Each reflective surface of the fore-optics mirrors and the spectrometer mirrors is a segment of a defined solid surface which has a known axis of symmetry, wherein each reflective surface is rotationally symmetric about the axis of symmetry of the solid surface of which it is a segment. The fore-optics and the spectrometer mirrors are mounted and aligned inside the system housing so that the axes of symmetry associated with the reflective surfaces of the primary, the secondary and the tertiary fore-optics mirrors coincide with one another, and the axes of symmetry associated with the reflective surfaces of the primary, the secondary and the tertiary spectrometer mirrors coincide with one another. Preferably, the common axes of the fore-optics and the spectrometer mirrors coincide with one another as well.

For a better understanding of the invention, reference is made to the following description taken in conjunction with the accompanying drawing and the appended claims.

BRIEF DESCRIPTION OF THE DRAWING

In the drawing:

FIGS. 15A to 15F disclose a working prescription for the optical components of the folded embodiment of FIGS. 14 and 15.

DETAILED DESCRIPTION OF THE INVENTION

Figure 1:
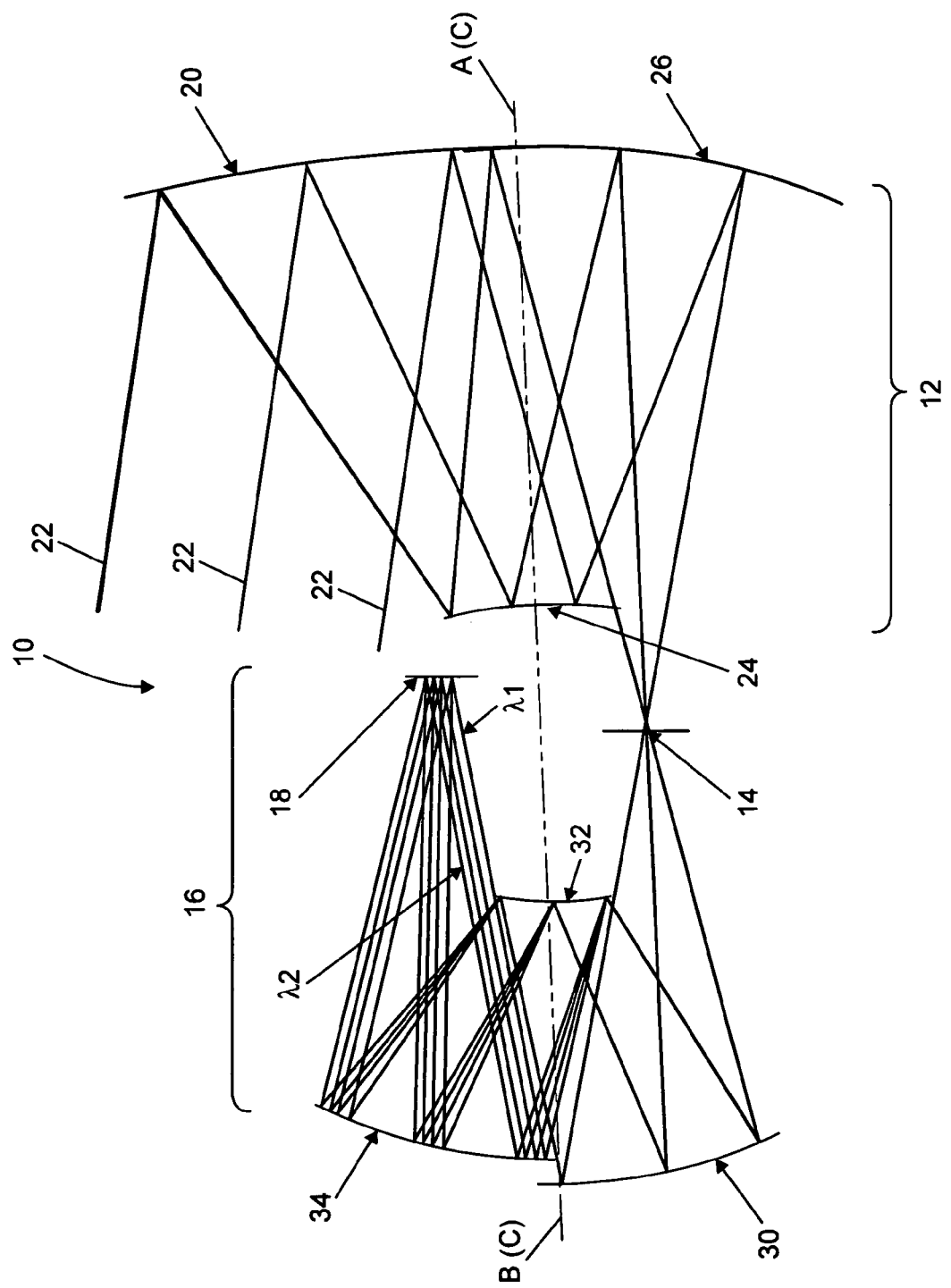
FIG. 1 is an optical diagram of a first embodiment of a hyperspectral imaging system according to the invention.

FIG. 1 shows a first embodiment of a hyperspectral imaging system 10 according to the invention. The system 10 is generally comprised of fore-optics 12, a spectrometer slit 14, and an Offner imaging spectrometer 16 including a focal plane array 18, all of which are assembled, aligned, and contained within a suitable housing (not shown in FIG. 1). Preferably, the fore-optics 12 is telecentric, and the spectrometer 16 is doubly telecentric so that the final image size will not change with an axial position of either the slit 14 or the focal plane array 18. This enables constant spectral sampling regardless of the slit and focal position. A constant and known spectral sampling is necessary to identify an object via its spectral components. In addition, image space telecentricity allows for an extremely uniform image plane illumination, which maximizes the utility of the focal plane array 18 in the inventive system 10.

The system fore-optics 12 functions as a three-mirror anastigmat and has a primary fore-optics mirror 20 as a first optical component. Light rays 22 from, e.g., an external scanning mirror are directed toward a reflective surface of the primary mirror 20, and the mirror directs the light toward a reflective surface of a secondary mirror 24 which acts as a second optical component of the fore-optics 12. The secondary mirror is conjugated with an aperture stop. The secondary mirror 24 directs light toward a reflective surface of a tertiary mirror 26 which acts as a third optical component of the fore-optics 12, and light rays from the tertiary mirror 26 form an intermediate image at the entrance of the spectrometer slit 14. The intermediate image is optically corrected to be substantially free of field curvature and distortion. This is necessary in order for the resulting final image to have minimal spectral and spatial distortion which, with constant spectral sampling, is critical to hyperspectral object identification. If the distortions are too large, then adjacent spectral/spatial channels will overlap thus reducing the spectral sensitivity of the imaging system. Typical airborne hyperspectral imagers require both spectral and spatial distortions to be less than 0.2 pixels. Low distortion also aids the image scanning process.

The slit 14 may be formed in a known manner, e.g., as a rectangle, and is typically from 40 to 80 microns (μm) wide. Slit width, a contributing factor to spectral resolution, is oriented in the plane of the drawing in FIG. 1. The length direction of the slit 14 is normal to the plane of the drawing in FIG. 1, and the slit length is sufficient to accommodate the height of the intermediate image formed by the light rays from the tertiary mirror 26 of the fore-optics 12. The system 10 is also preferably tilted about an axis that is parallel to the length dimension of the slit 14, and has a slightly off-axis field of view as explained below.

The Offner imaging spectrometer 16 in the system 10 of FIG. 1 has a primary spectrometer mirror 30 with a reflective surface that is positioned to receive light exiting from the entrance slit 14, and to direct the light toward a secondary mirror 32. The mirror 32 acts as an aperture stop and incorporates a diffractive element on its surface. Diffracted light having spectral components, with wavelengths between $\lambda 1$ and $\lambda 2$, is reflected by the mirror 32 toward a reflective surface of a tertiary mirror 34. The mirror 34 then forms an image of the diffracted light on an active surface of the focal plane array 18. The image is substantially distortion free both spatially and spectrally. Image spectral width is in the plane of drawing in FIG. 1, and image spatial length is normal to the drawing in FIG. 1.

According to the invention, each of the reflective surfaces of the mirrors 20, 24 and 26 of the fore-optics 12 is a segment of a solid surface which has a known geometrical axis of symmetry, that is, each reflective surface is rotationally symmetric about the axis of symmetry of the solid surface of which it is a segment. Also, each of the reflective surfaces of the mirrors 30, 32 and 34 of the imaging spectrometer 16 is a segment of a solid surface that has a known geometrical axis of symmetry. The mirrors are positioned in the system 10 so that the axes of symmetry associated with the reflective surfaces of the fore-optics mirrors 20, 24, and 26 coincide with one another to define common geometrical axis A of the fore-optics 12, and the axes of symmetry associated with the reflective surfaces of the imaging spectrometer mirrors 30, 32 and 34 coincide to define a common geometrical axis B of the imaging spectrometer 16.

Further, the fore-optics and the imaging spectrometer mirrors may be disposed in the system 10 so that the common geometrical axis A of the fore-optics and the common geometrical axis B of the imaging spectrometer are coincident, to define a common system axis C for all reflective surfaces in the system 10. Moreover, the common system axis C may itself be folded at one or more locations (see FIGS. 2, 8, 14 and 15 and related description below) so that the system 10 can be assembled and provided in relatively compact form.

Some or all the reflective surfaces of the mirrors of the fore-optics 12 and the imaging spectrometer 16 may be segments of solid surfaces that are generally aspherical, i.e., surfaces that do not form part of a sphere such as, for example, surfaces that are ellipsoidal, hyperboloidal or paraboloidal in shape. Alternatively, some or all of the reflective surfaces may be conics, or spherical. Preferably, in order from the reflective surface of the primary fore-optics mirror 20 to the reflective surface of the tertiary imaging spectrometer mirror 34, the surfaces are segments of the following solid surfaces;

mirror 20: hyperboloidal
mirror 24: oblique ellipsoidal
mirror 26: ellipsoidal
mirror 30: oblique ellipsoidal mirror 32: oblique ellipsoidal mirror 34: oblique ellipsoidal Moreover, the fore-optics 12 and the imaging spectrometer 16 operate with off-axis apertures, that is, the reflective surfaces of the fore-optics primary mirror 20 and the spectrometer primary mirror 30 do not intersect the common system axis C, so that the system 10 has a tilt and decentration, as follows:

$tg\theta \times \Delta_{S1}$=0.3 to 1.20 inches $\Delta_{S1}/EFL$=0.3 to 0.68 wherein $tg\theta$ is the tangent of a tilt angle of the imaging system 10 about an axis parallel to the long dimension of the slit 14;

$\Delta_{S1}$ is the decentration in inches of the aperture at the surface of the fore-optics primary mirror 20 and EFL is the effective focal length of the imaging system 10.

Further, the relationships between constructive parameters of the fore-optics 12 are preferably as follows:

$\Phi_1/\Phi_2$=(−0.15) to (−0.35)

$\Phi_1/\Phi_3$=0.30 to 0.55

$D_1/EFL$=0.60 to 0.75

$D_2/EFL$=0.60 to 0.75 wherein $\Phi_1$, $\Phi_2$ and $\Phi_3$ are optical powers of the primary, the secondary, and the tertiary fore-optics mirrors 20, 24, 26, respectively, $D_1$ and $D_2$ are distances in inches, respectively, between the vertices of the solid surfaces associated with the primary and the secondary mirrors 20, 24; and between the vertices of the solid surfaces associated with the secondary and the tertiary mirrors 24, 26.

Moreover, relationships between constructive parameters of the imaging spectrometer 16 are preferably as follows:

$\Phi_{1S}/\Phi_{2S}$=(−0.50) to (−0.80)

$\Phi_{3S}/\Phi_{2S}$=(−0.50) to (−0.80)

$(D_{1S}+R_{2S})/R_{1S}$=0.8 to 1.7 wherein $\Phi_{1S}$, $\Phi_{2S}$ and $\Phi_{3S}$ are optical powers of the primary, the secondary, and the tertiary spectrometer mirrors 30, 32, 34, respectively, $D_{1S}$ is a distance in inches between the vertices of the solid surfaces associated with the primary and the secondary mirrors 30, 32, $R_{2S}$ is a radius of the secondary mirror 32, and $R_{1S}$ is a radius of the primary mirror 30.

It has been demonstrated that the foregoing relationships among the optical powers of the fore optics 12 and the imaging spectrometer 16 allow for correction of coma, astigmatism and field curvature at both the entrance slit 14 and the focal plane array 18. Spectral and spatial distortion magnitudes do not exceed 1/10th of a pixel for a 27 micron pixel size. Other desirable results are that imaging spectrometer 16 is doubly telecentric, the field of view is large, and spectral sampling is high.

Figure 2:
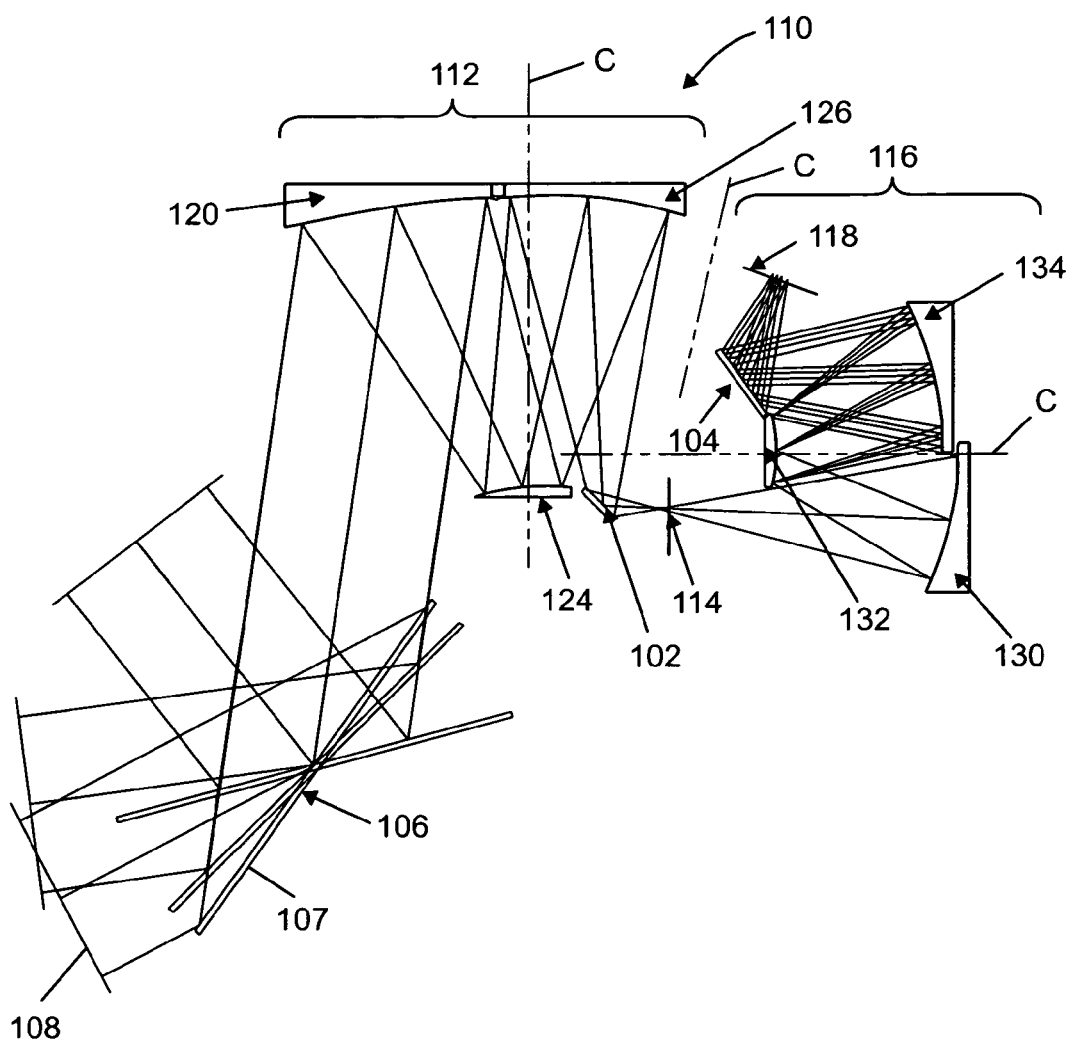
FIG. 2 is an optical diagram of a folded version of the first embodiment of FIG. 1.
Figure 3:
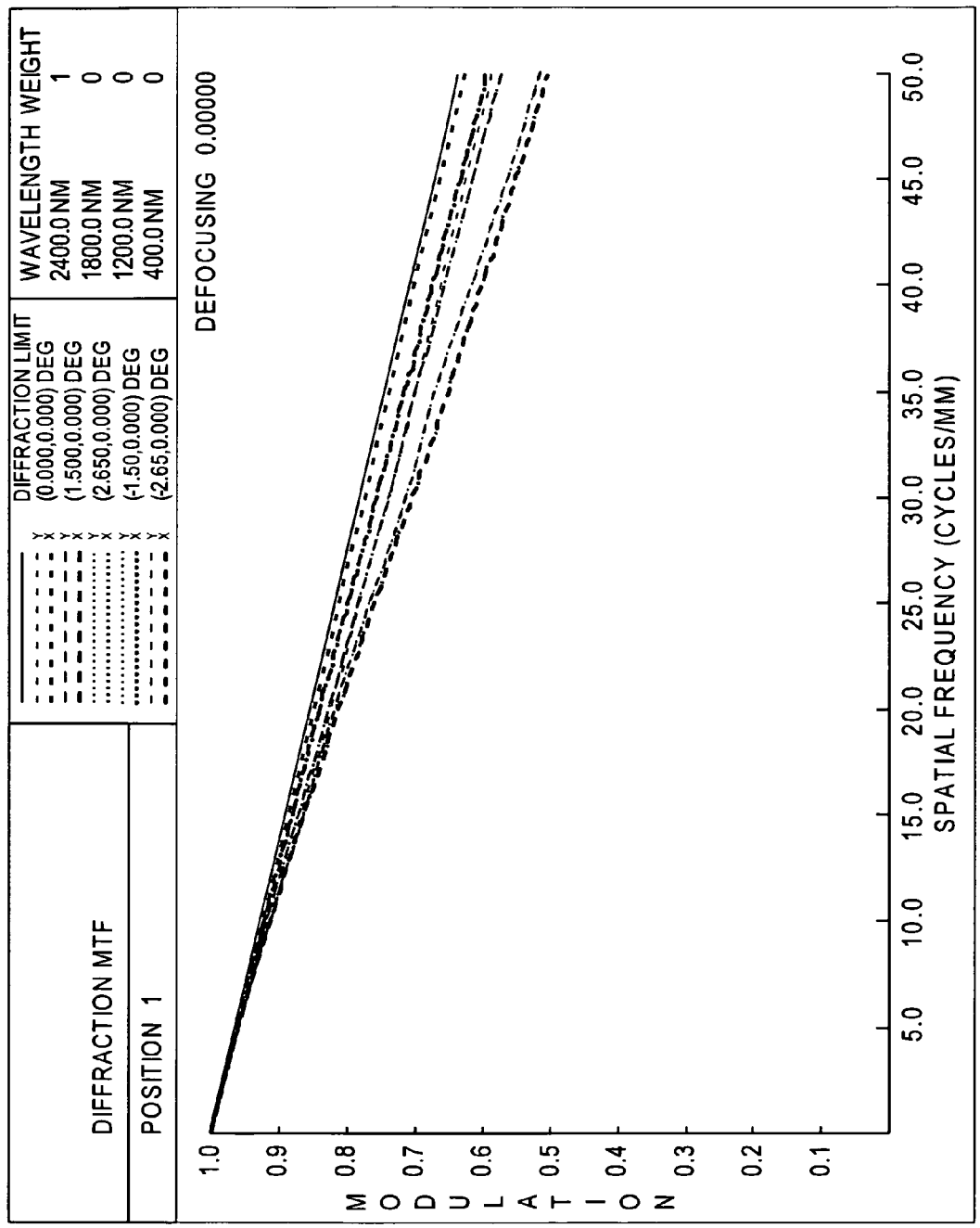
FIGS. 3 to 6 show modulation transfer functions (MTFs) calculated for the systems of FIGS. 1 and 2 for different wavelengths of received light.
Figure 4:
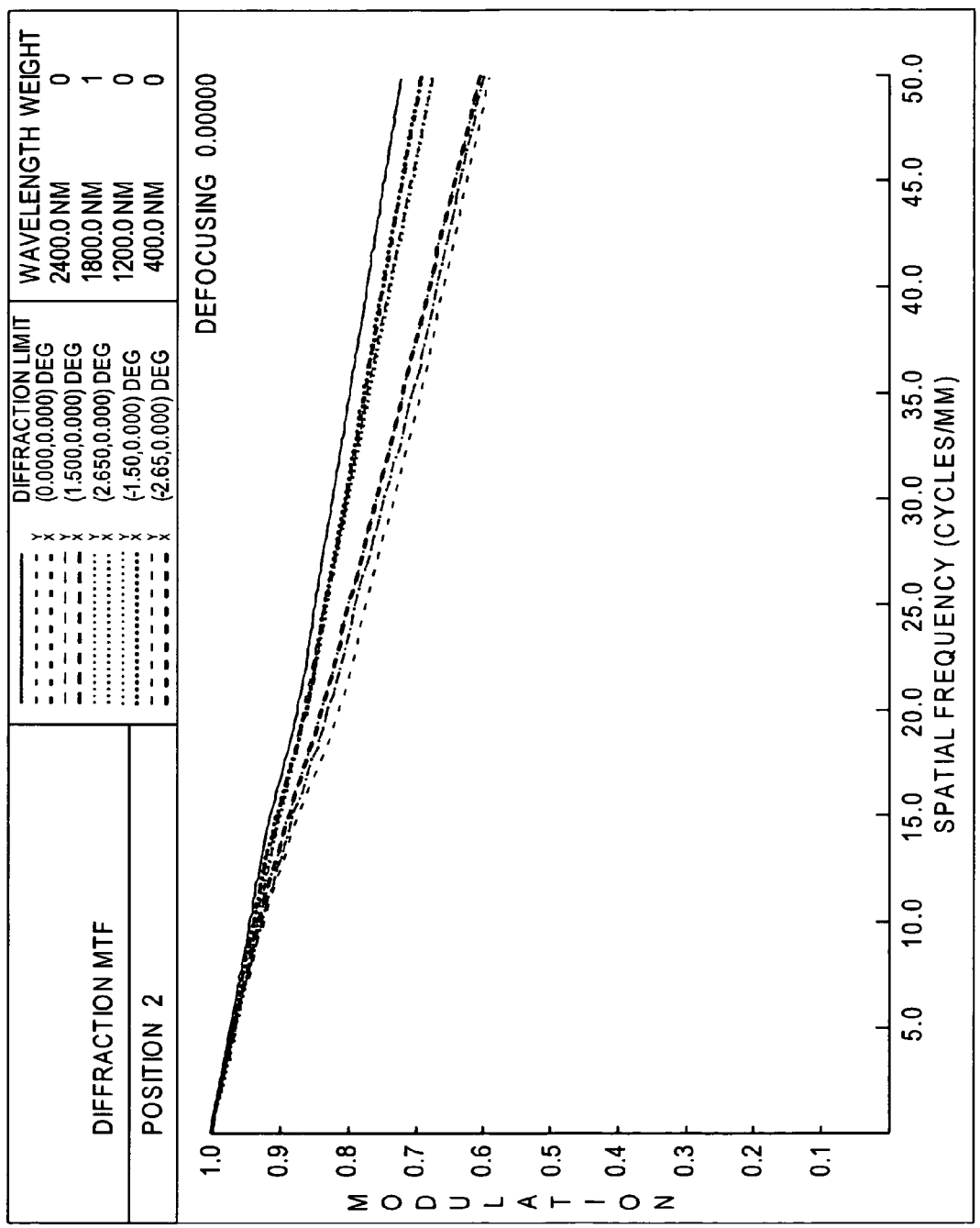
Figure 5:
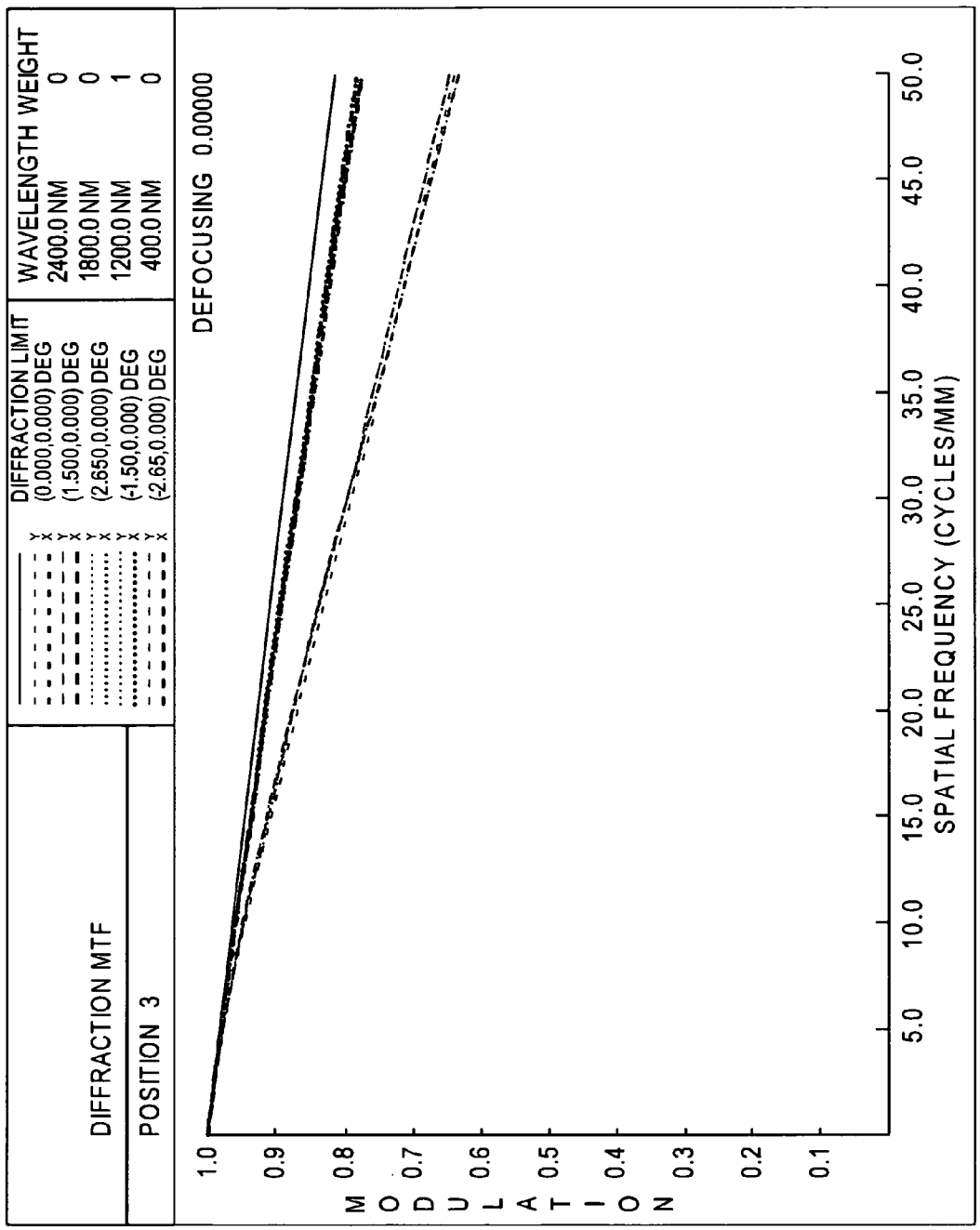
Figure 6:
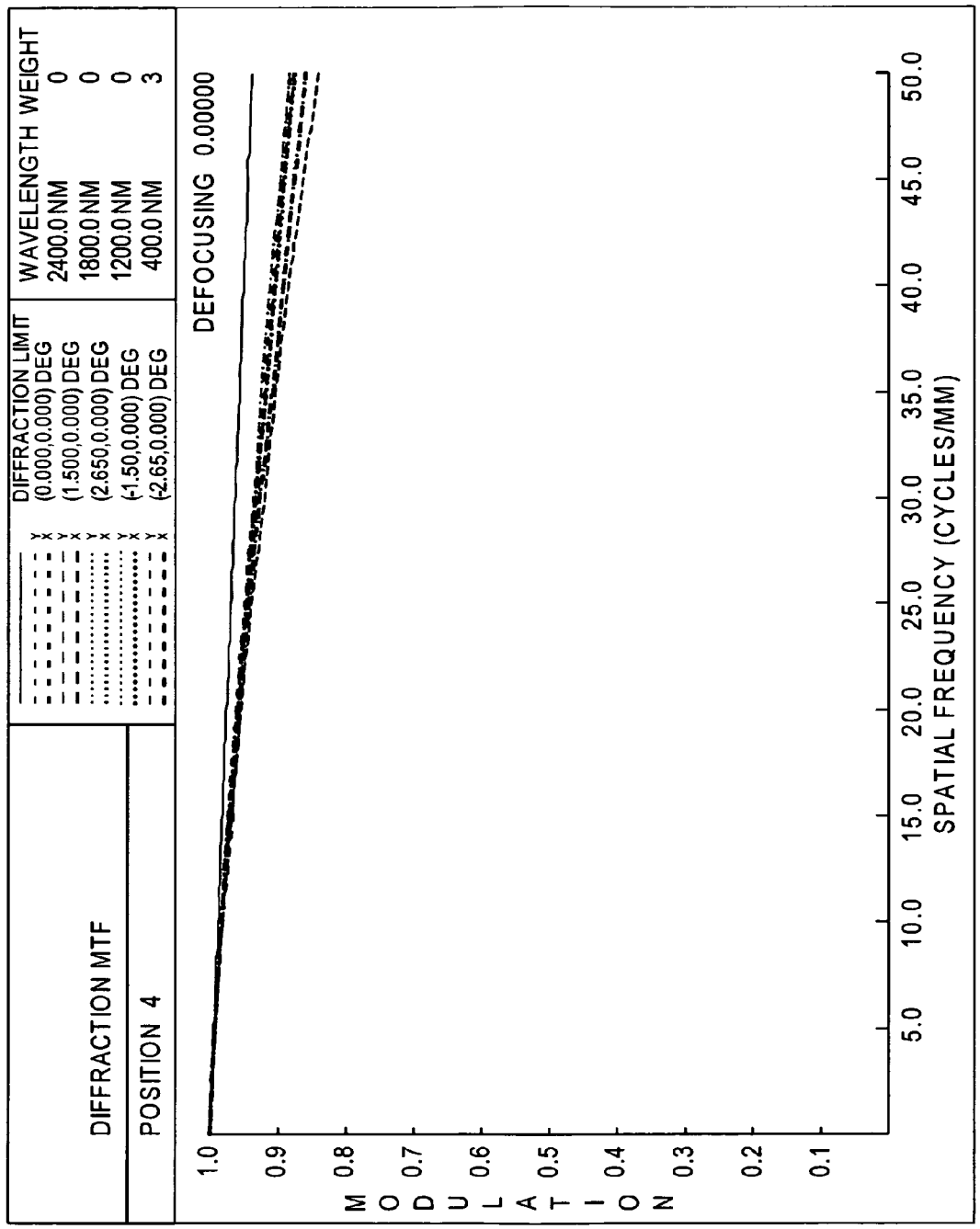

FIG. 2 shows a hyperspectral imaging system 110 wherein the system 10 of FIG. 1 is modified so that the common system axis C is twice folded. Components of the system 110 that are the same as or similar to those in the system 10 in FIG. 1, have corresponding reference numerals increased by 100.

FIG. 2 also shows an associated object scanning mirror assembly 106. The assembly 106 may be conventional, and is operative to reflect light from remote objects 108 and incident on the surface of a scanning mirror 107, toward a primary mirror 120 of the system fore-optics 112.

In system 110, the system axis C is folded first by a mirror 102 disposed between tertiary mirror 126 of fore-optics 112 and aperture slit 114, and again by a mirror 104 disposed between tertiary mirror 134 of imaging spectrometer 116 and focal plane array 118.

EXAMPLE ONE

The systems 10 and 110 of FIGS. 1 and 2, can meet the following specifications when constructed as described above. FIGS. 3, 4, 5 and 6 show Modulation Transfer Functions (MTFs) calculated for either system at each of four different wavelengths of received light; namely, 2.4 µm, 1.8 µm, 1.2 µm and 0.4 µm.

| | |
|---|---|
| TMA (fore-optics 12 or 112) EFL: | 7.41 inches |
| FNO (F-Number): | 2.5 |
| WL (wavelength range) | 0.4 µm to 2.4 µm |
| Detector (focal plane array 18 or 118): | 27 µm pixel, 640 × 256 pixels 0.68 inches spatial × 0.272 inches spectral |
| Spectral sampling: | 7.6 nm/pixel |

At Entrance Spectrometer (Slit 14 or 114):

| | |
|---|---|
| The TMA ensquared energy for a 27 micron square: | 66% at 0.45 µm 66% at 1.0 µm 60% at 2.35 µm |

Modulation Transfer Function (MTF) Requirements:

| | Wavelength (µm) | | |
|---|---|---|---|
| Frequency (cycles/mm) | 0.45 | 1.0 | 2.3 |
| 18.5 | 65 | 65 | 50 |
| 37.5 | 27 | 35 | 10 |

Smile, keystone < 0.1 pixel (2.7 µm)

Calculated Performance

| WL1 = 2.4 µm | WL2 = 1.8 µm | WL3 = 1.2 µm | WL4 = 0.4 µm |
|---|---|---|---|

| Smile in µm | Keystone in µm (relative to WL1) |
|---|---|
| WL1: −0.0987059 | WL1: N/A |
| WL2: 0.0766029 | WL2: 0.134778 |
| WL3: 0.103158 | WL3: 0.0368343 |
| WL4: −0.0618373 | WL4: −0.005626 |
| FNO: | 2.5 |
| Spatial field: | 0.68 inches |
| Spectral field: | 0.272 inches |
| EFL cross field variation: | <0.3% |
| Telecentric | |

Figure 7:
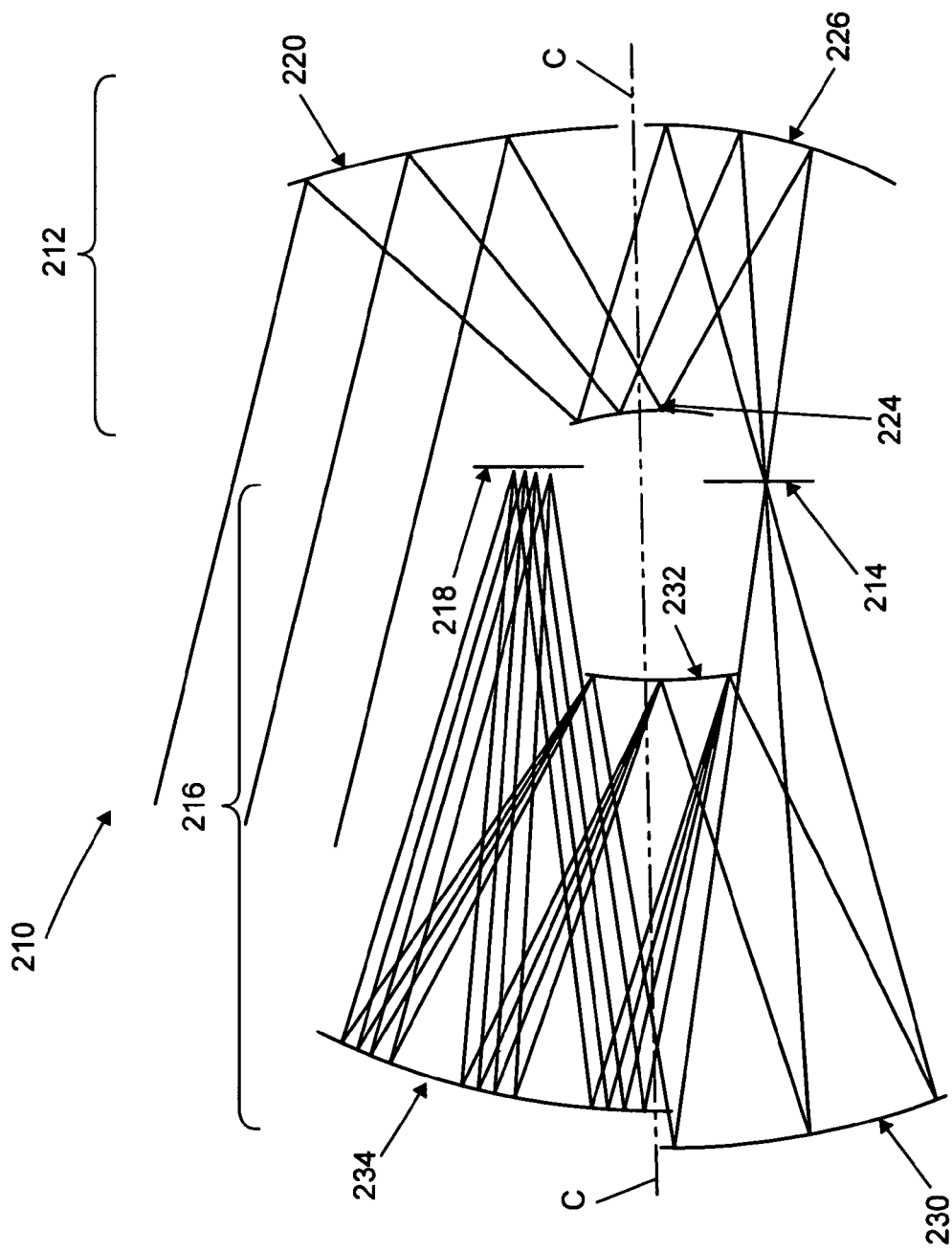
FIG. 7 is an optical diagram of a second embodiment of a hyperspectral imaging system according to the invention.

FIG. 7 shows a hyperspectral imaging system 210 wherein the system 10 of FIG. 1 is modified to be more compact while still obtaining high spectral sampling. Components of the system 210 that are the same as or similar to those in the embodiment 10 in FIG. 1, have corresponding reference numerals increased by 200.

Figure 8:
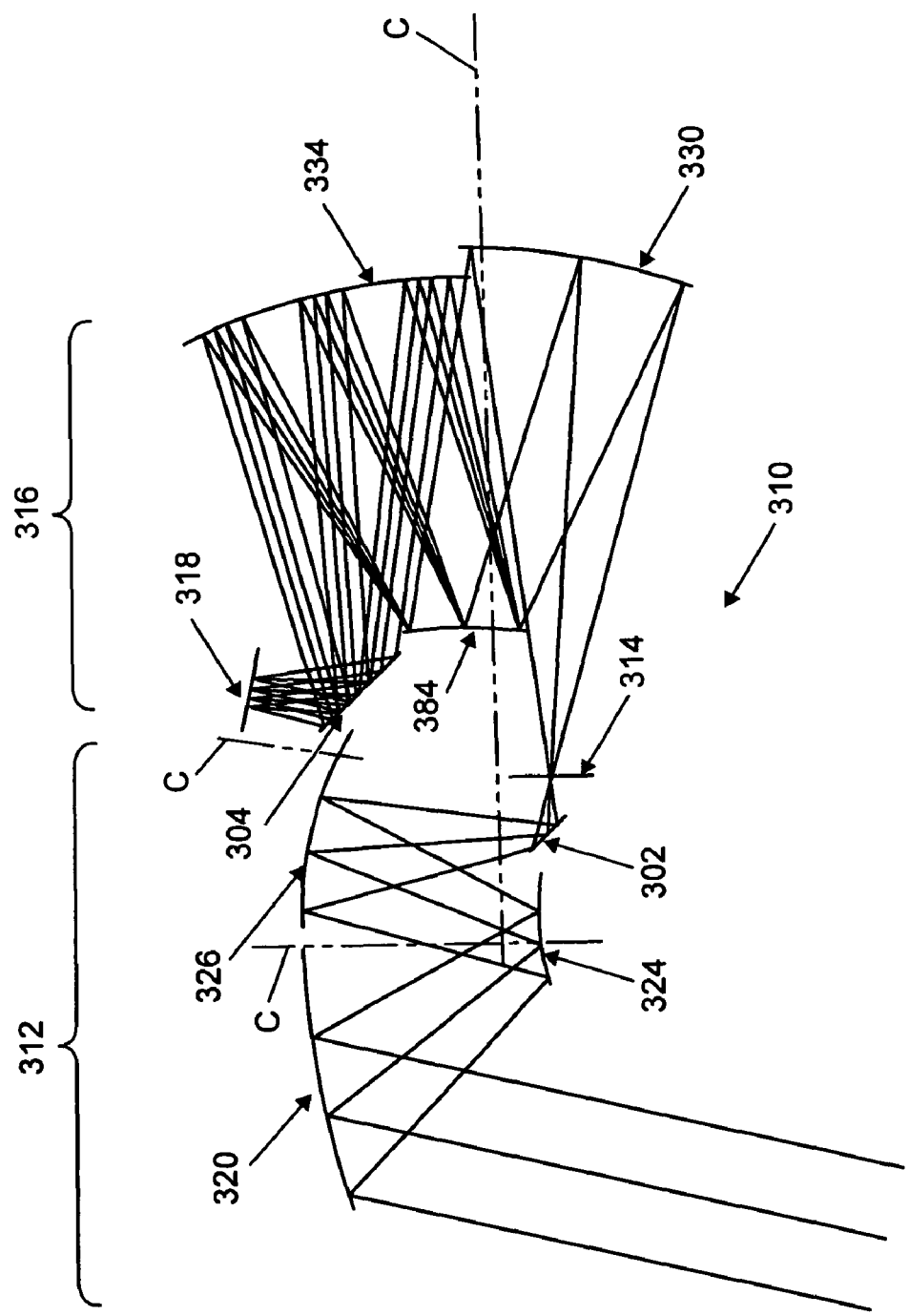
FIG. 8 is an optical diagram of a folded version of the second embodiment of FIG. 7.
Figure 9:
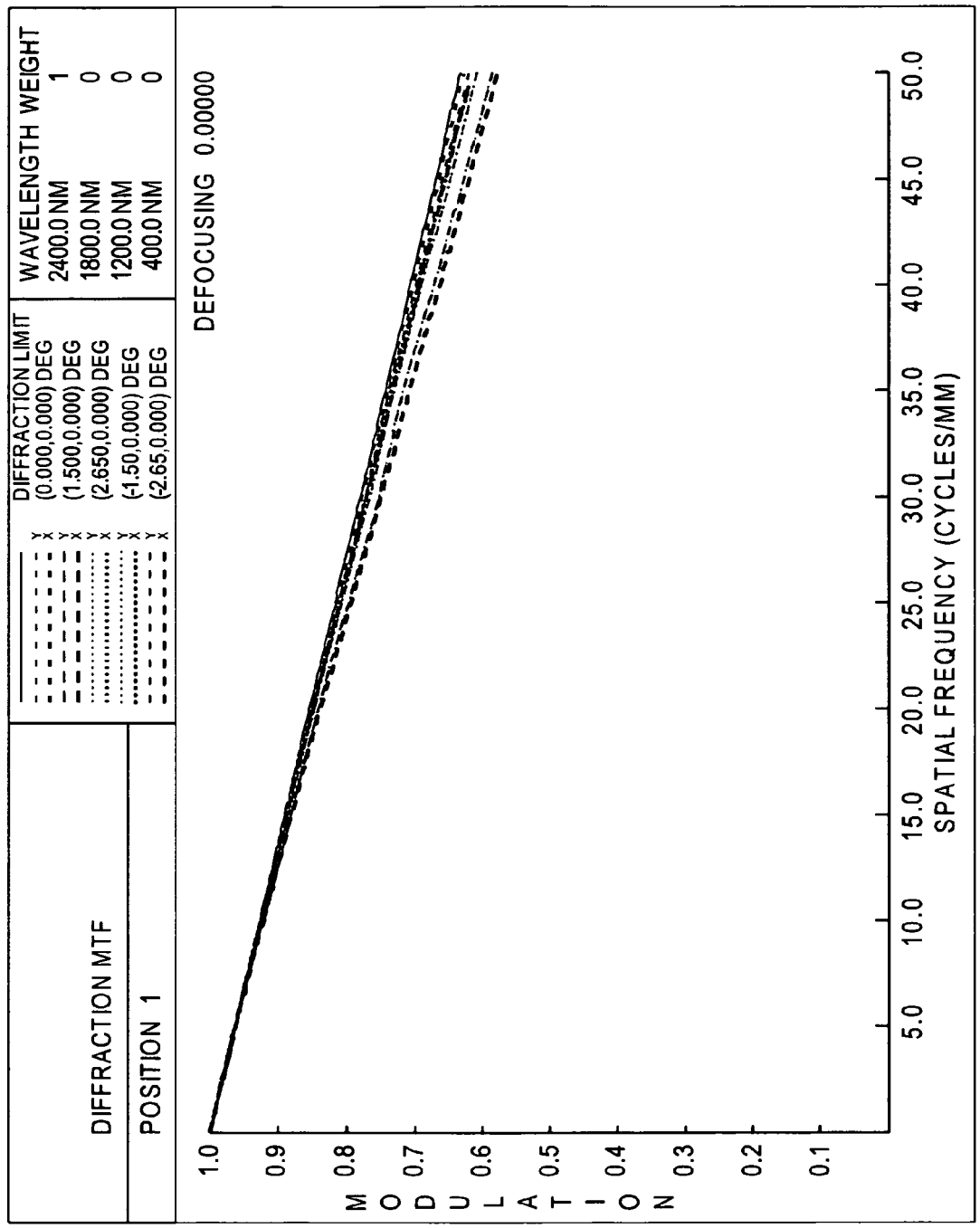
FIGS. 9 to 12 show modulation transfer functions (MTFs) calculated for the systems of FIGS. 7 and 8 for different wavelengths of received light.
Figure 10:
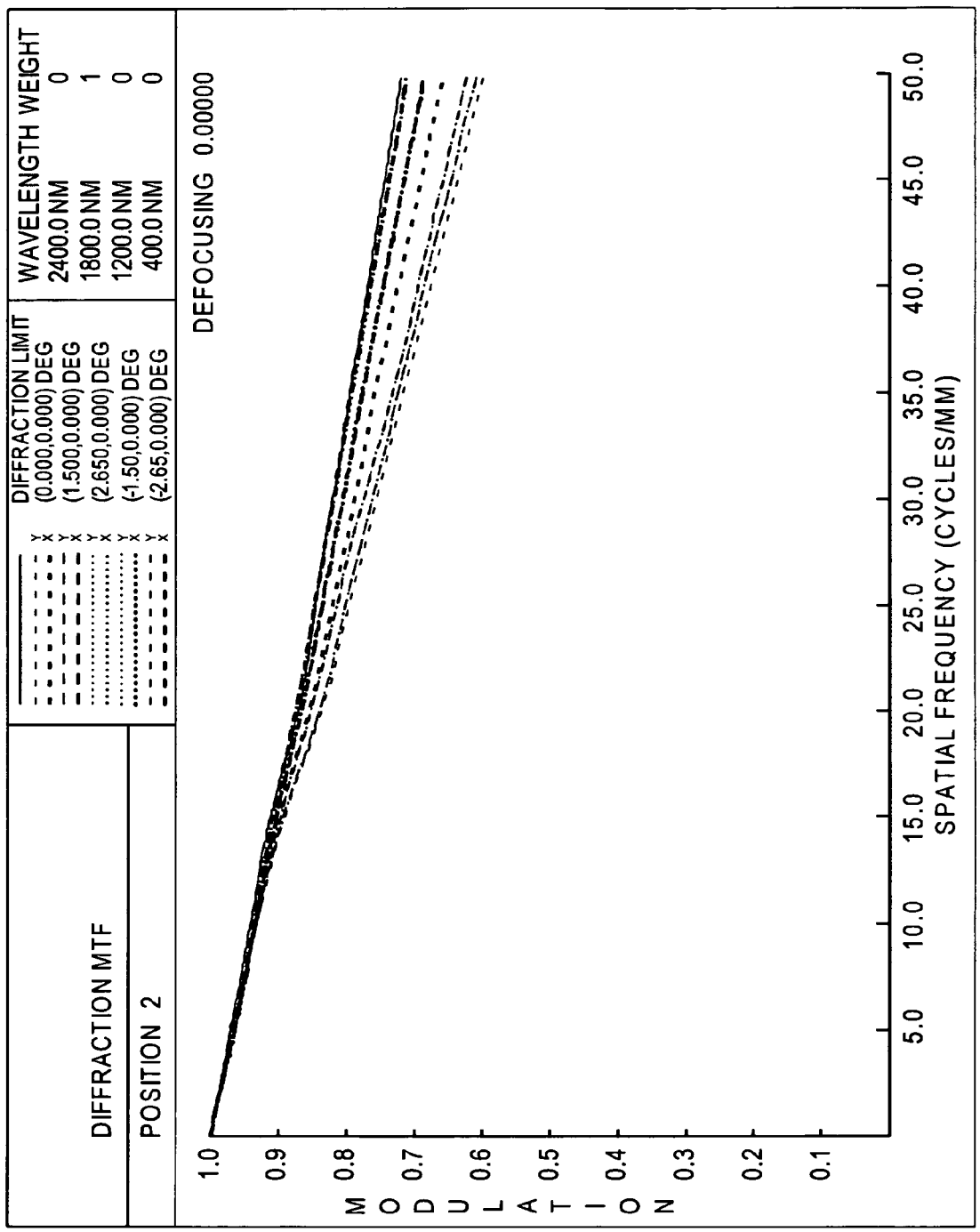
Figure 11:
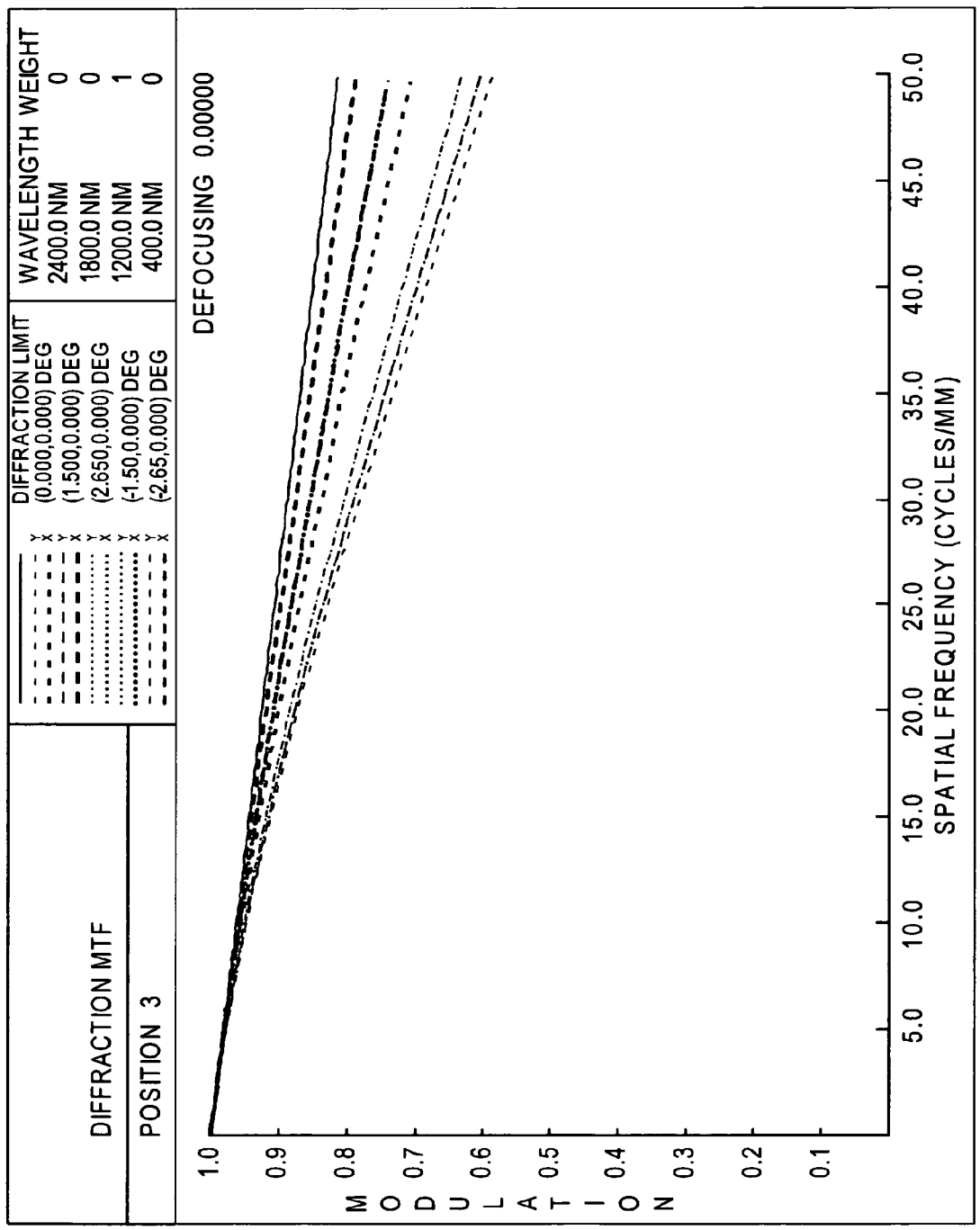
Figure 12:
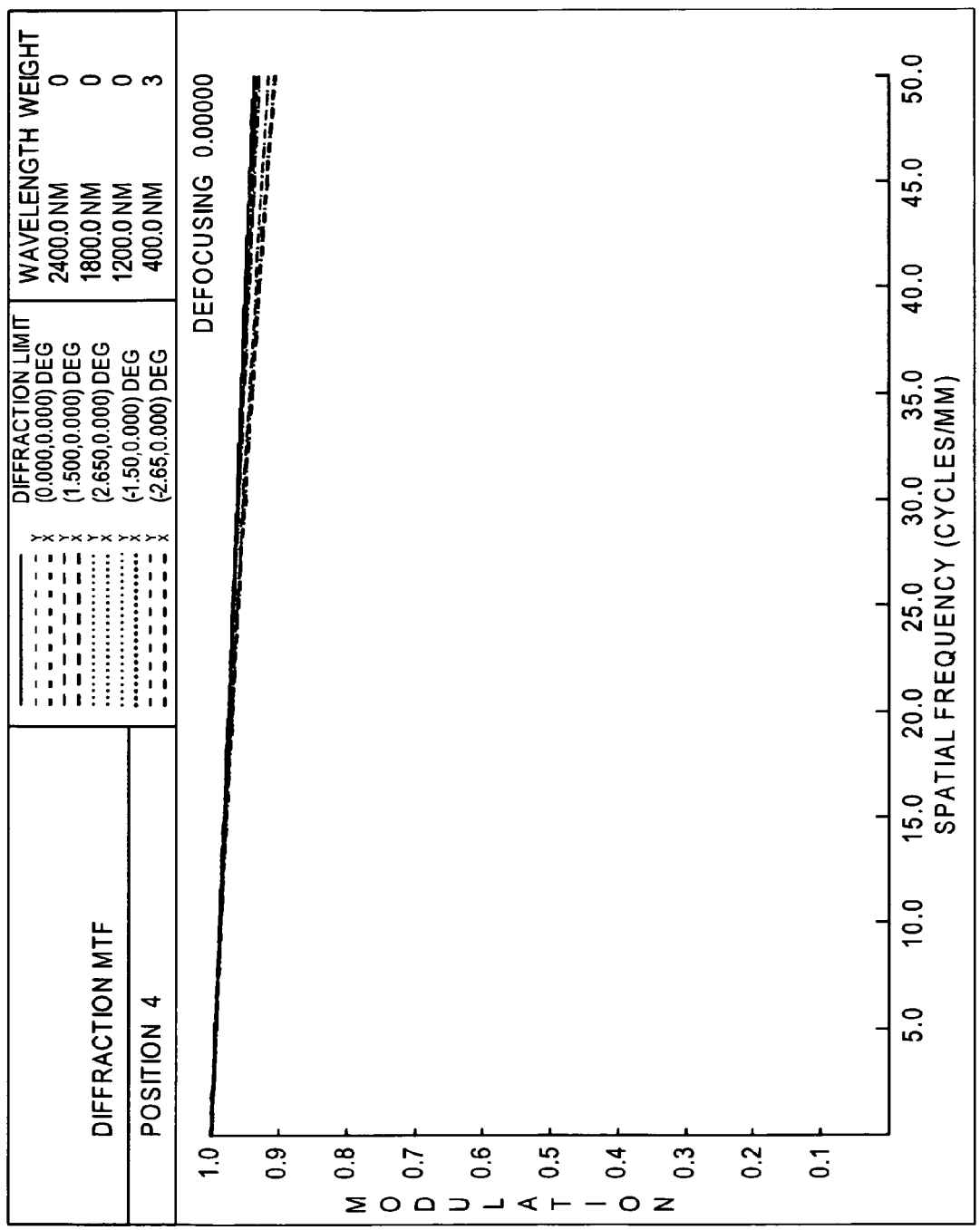

FIG. 8 shows a hyperspectral imaging system 310 wherein the system 210 of FIG. 7 is modified so that the common system axis C is twice folded. Components of the system 310 that are the same as or similar to those in the folded system 110 in FIG. 2, have corresponding reference numerals increased by 200. In system 310, the system axis C is folded first by a mirror 302 disposed between tertiary mirror 326 of fore-optics 312 and aperture slit 314, and again by a mirror 304 disposed between tertiary mirror 334 of imaging spectrometer 316 and focal plane array 318.

EXAMPLE TWO

The systems 210 and 310 of FIGS. 7 and 8, can meet the following specifications when constructed as described above. FIGS. 9, 10, 11 and 12 show modulation transfer functions (MTFs) calculated for either system at each of four different wavelengths of received light; namely, 2.4 µm, 1.8 µm, 1.2 µm and 0.4 µm.

| | |
|---|---|
| TMA (fore-optics 212 or 312) EFL: | 3.26 inches |
| FNO | 2.5 |
| WL: | 0.4 µm to 2.4 µm |
| Detector (focal plane array 218 or 318): | 27 µm pixel, 256 × 256 pixels 0.272 inches spatial × 0.272 inches spectral |
| Spectral sampling: | 7.6 nm/pixel |

At Entrance Spectrometer (Slit 214 or 314):

| | |
|---|---|
| The TMA ensquared energy for a 27 micron square: | 66% at .45 µm 66% at 1.0 µm 60% at 2.35 µm |

MTF Requirements:

| | Wavelength (µm) | | |
|---|---|---|---|
| Frequency (cycles/mm) | 0.45 | 1.0 | 2.3 |
| 18.5 | 65 | 65 | 50 |
| 37.5 | 27 | 35 | 10 |

Smile, keystone < 0.1 pixel (2.7 µm)

Calculated Performance

| WL1 = 2.4 µm WL2 = 1.8 µm WL3 = 1.2 µm WL4 = 0.4 µm | |
|---|---|
| Smile in µm | Keystone in µm (relative to WL1) |
| WL1: 0.44485 | WL1: N/A |
| WL2: 0.654142 | WL2: −0.349985 |
| WL3: 0.825789 | WL3: −0.860778 |
| WL4: 1.00508 | WL4: −1.73592 |

-continued

| WL1 = 2.4 µm WL2 = 1.8 µm WL3 = 1.2 µm WL4 = 0.4 µm | |
|---|---|
| Smile in µm | Keystone in µm (relative to WL1) |
| FNO: | 2.5 |
| Spatial field: | 0.272 inches |
| Spectral field: | 0.272 inches |
| EFL cross field variation: | <0.3% |
| Telecentric | |

Figure 13:
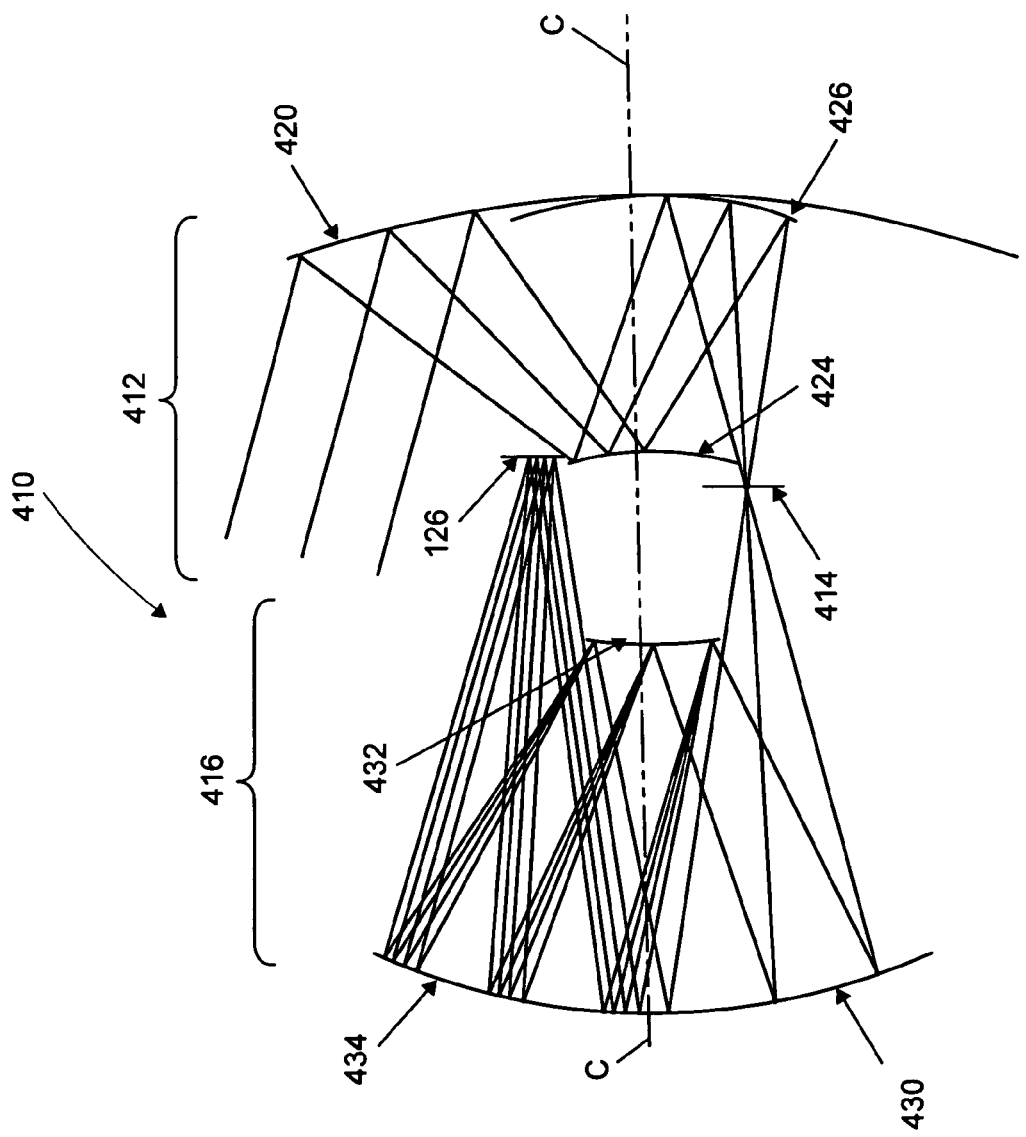
FIG. 13 is an optical diagram of a third embodiment of a hyperspectral imaging system according to the invention.

FIG. 13 shows a hyperspectral imaging system 410 wherein the system 10 of FIG. 1 is modified to be more compact, and the reflective surfaces of the optical components of the fore-optics 412 and the imaging spectrometer 416 are conical, i.e., the surfaces are defined by second order equations thereby making the system 410 less laborious to fabricate, align and test while still maintaining a large field of view. Components of the system 410 that are the same as or similar to those in the embodiment 10 in FIG. 1, have corresponding reference numerals increased by 400.

Figure 14:
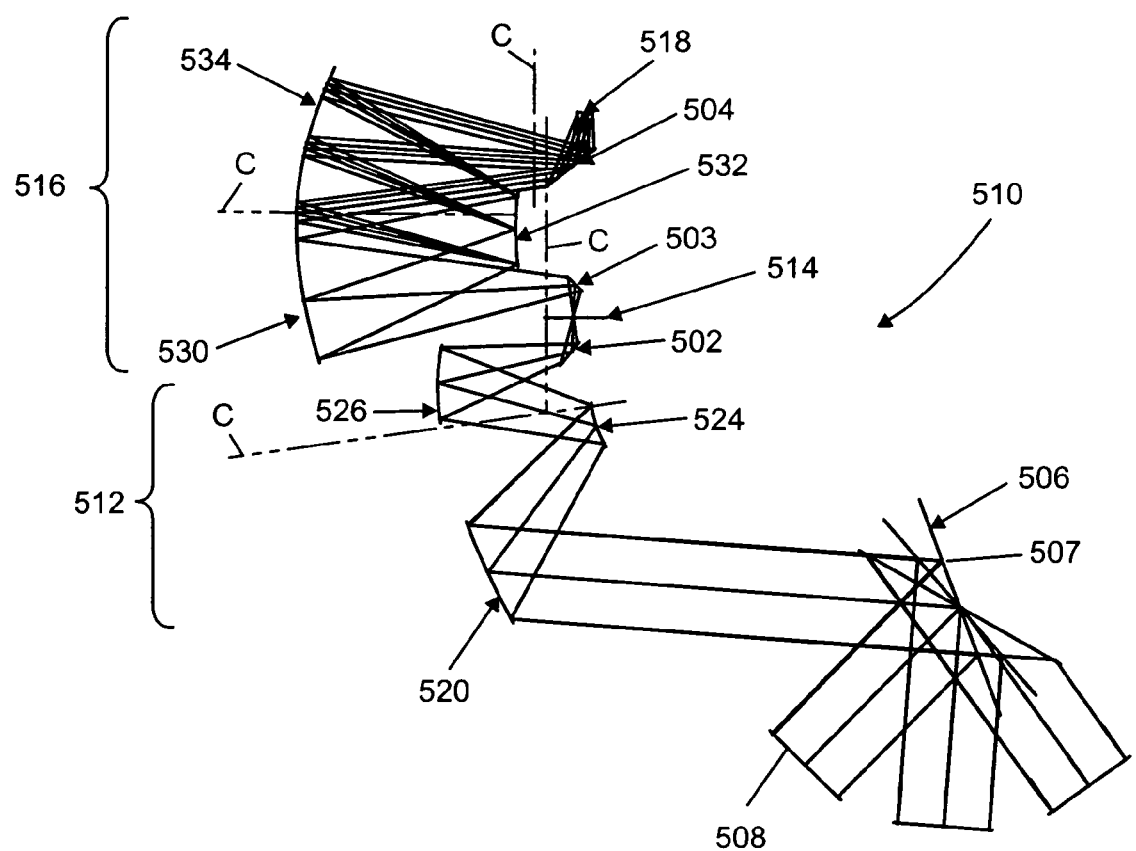
FIG. 14 is an optical diagram of a folded version of the third embodiment of FIG. 5.
Figure 15:
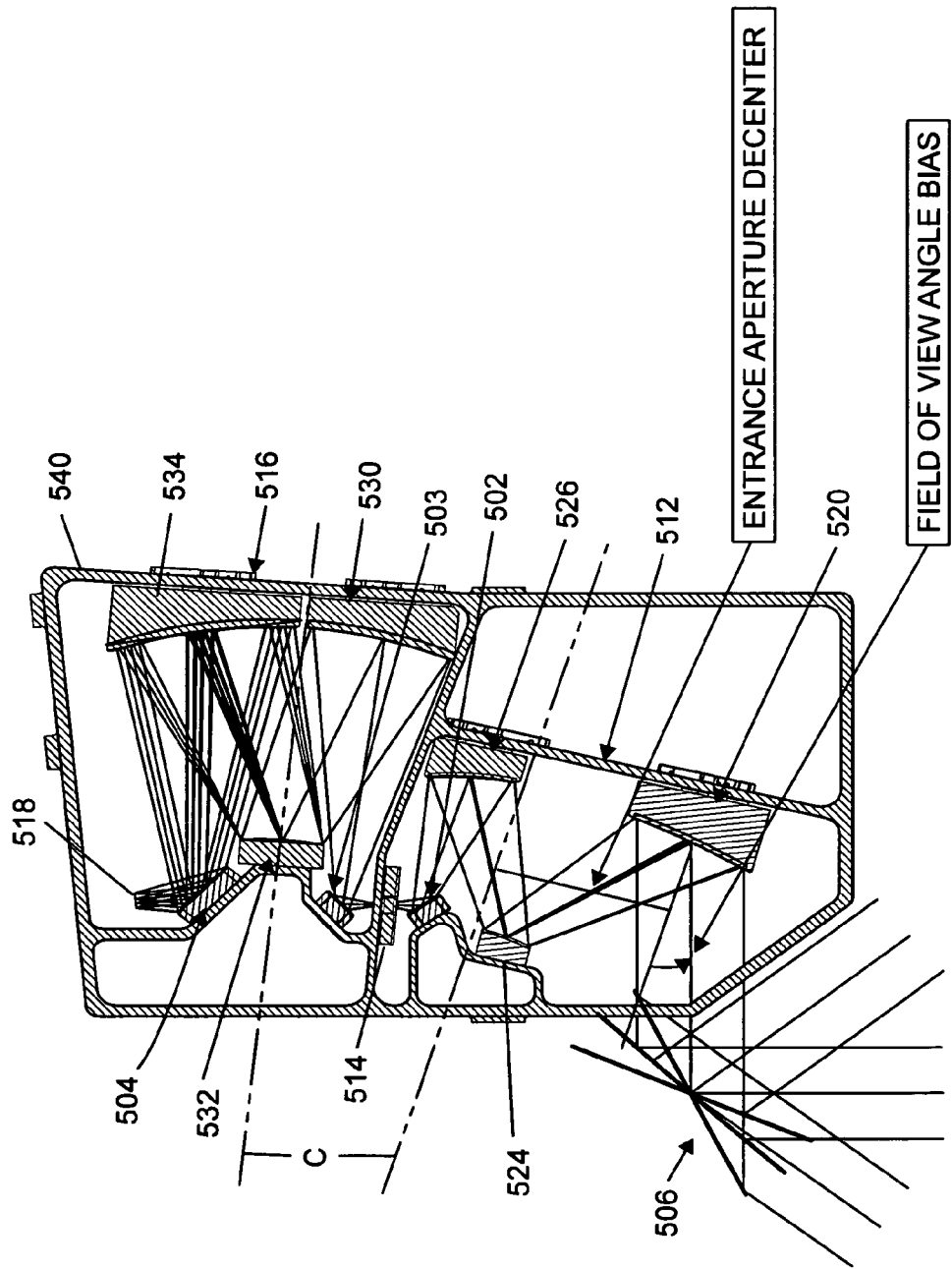
FIG. 15 shows the folded embodiment of FIG. 14 mounted in an associated housing.
Figure 16:
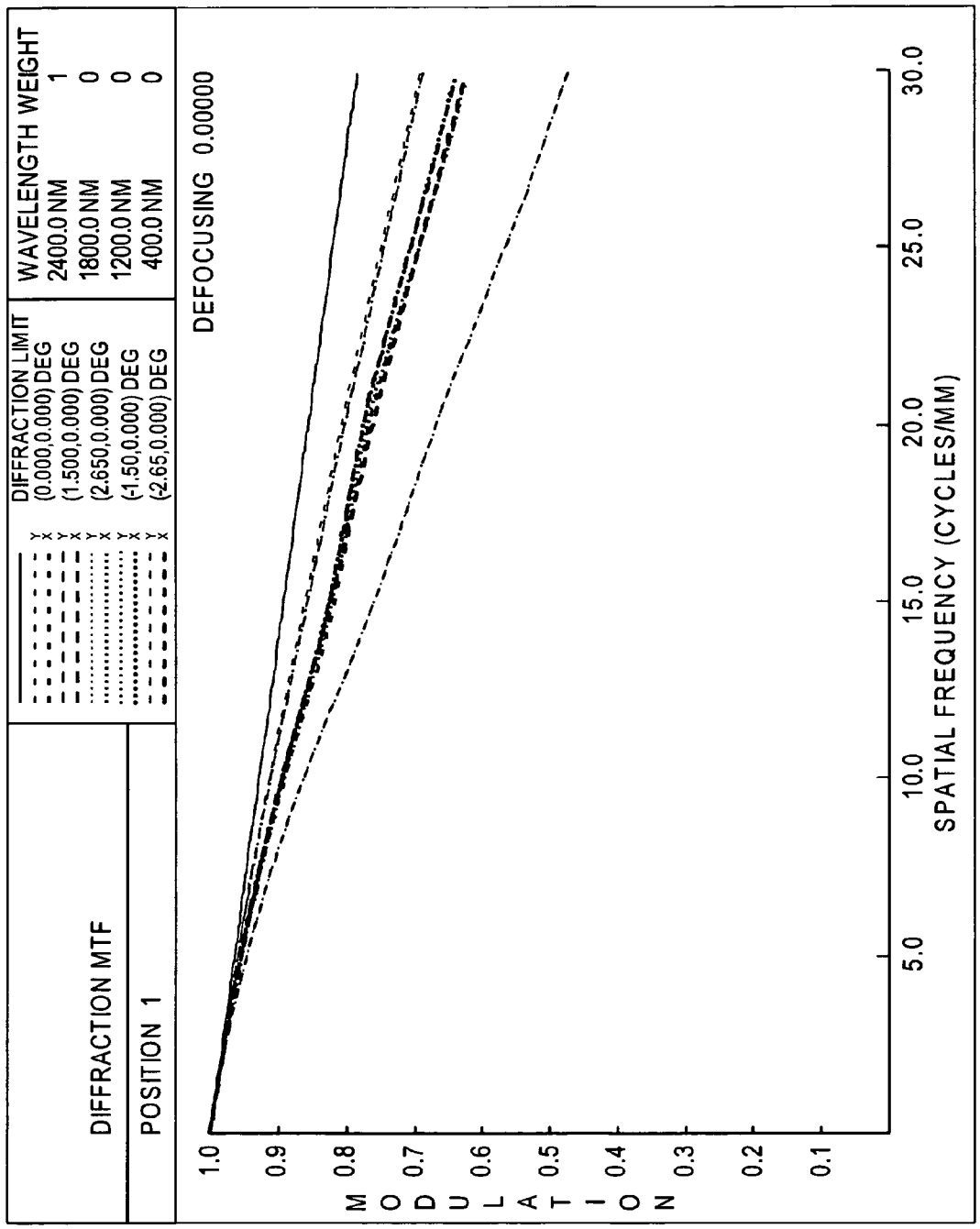
FIGS. 16 to 19 are modulation transfer functions (MTFs) calculated for the systems of FIGS. 13 and 14 for different wavelengths of received light.
Figure 17:
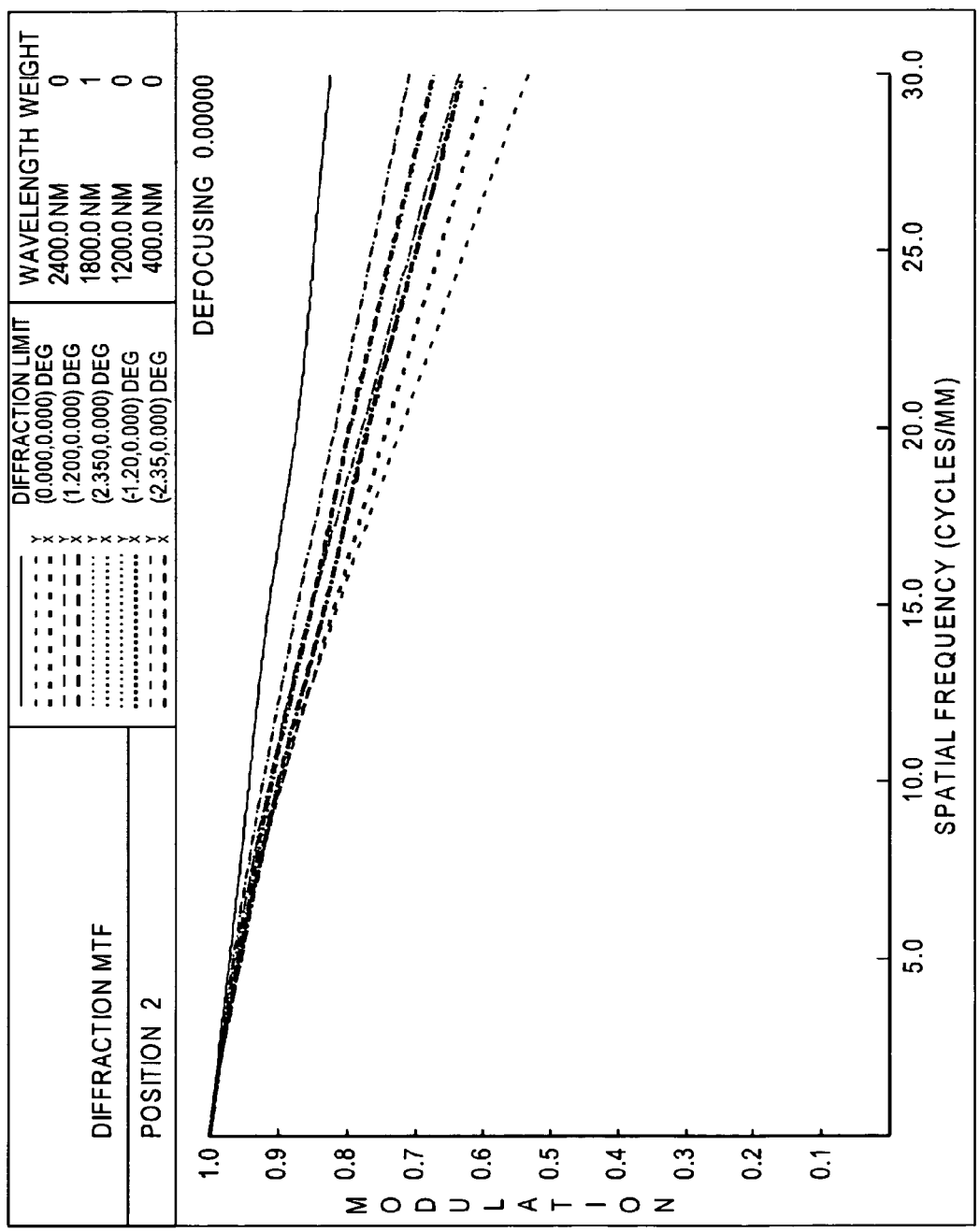
Figure 18:
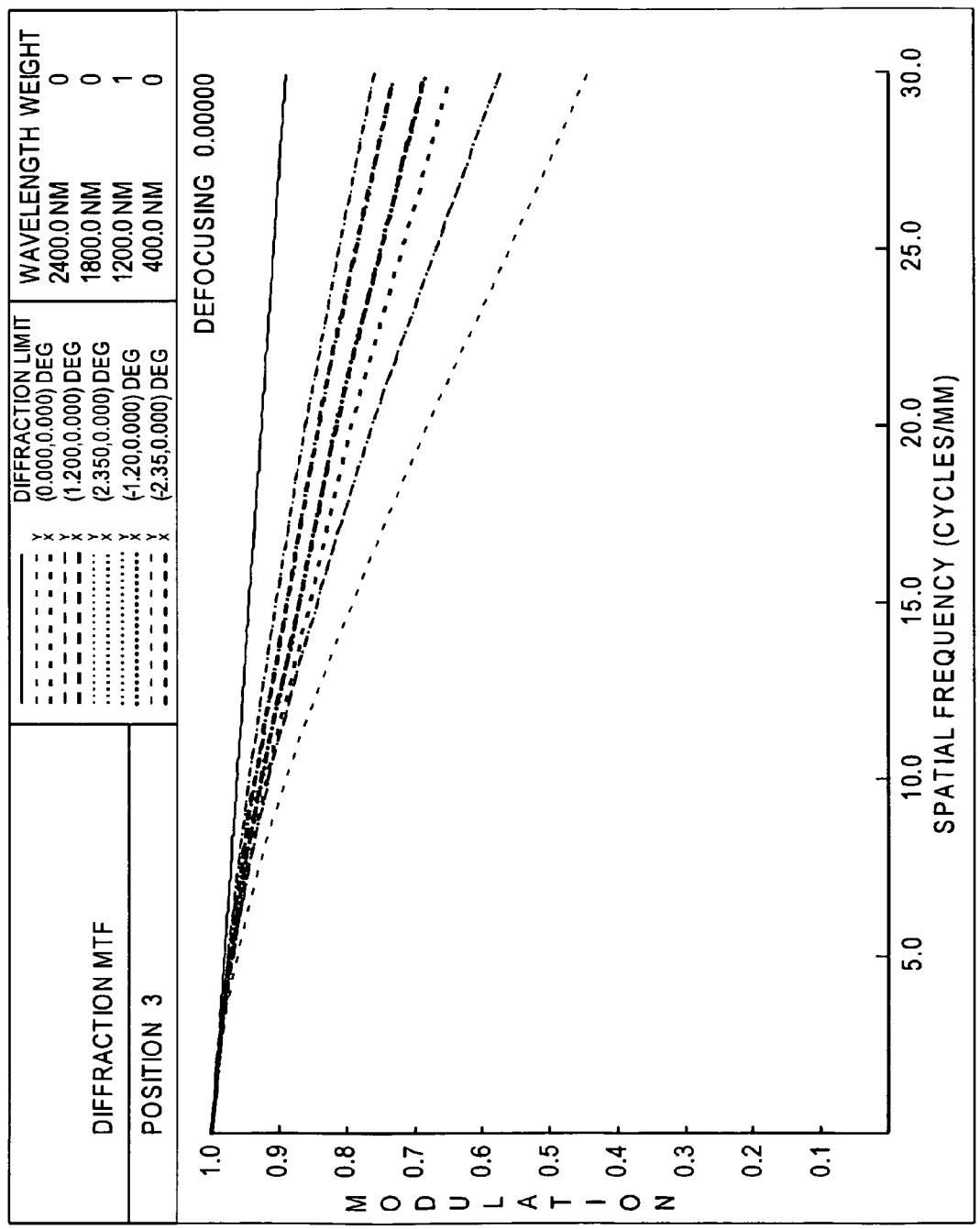
Figure 19:
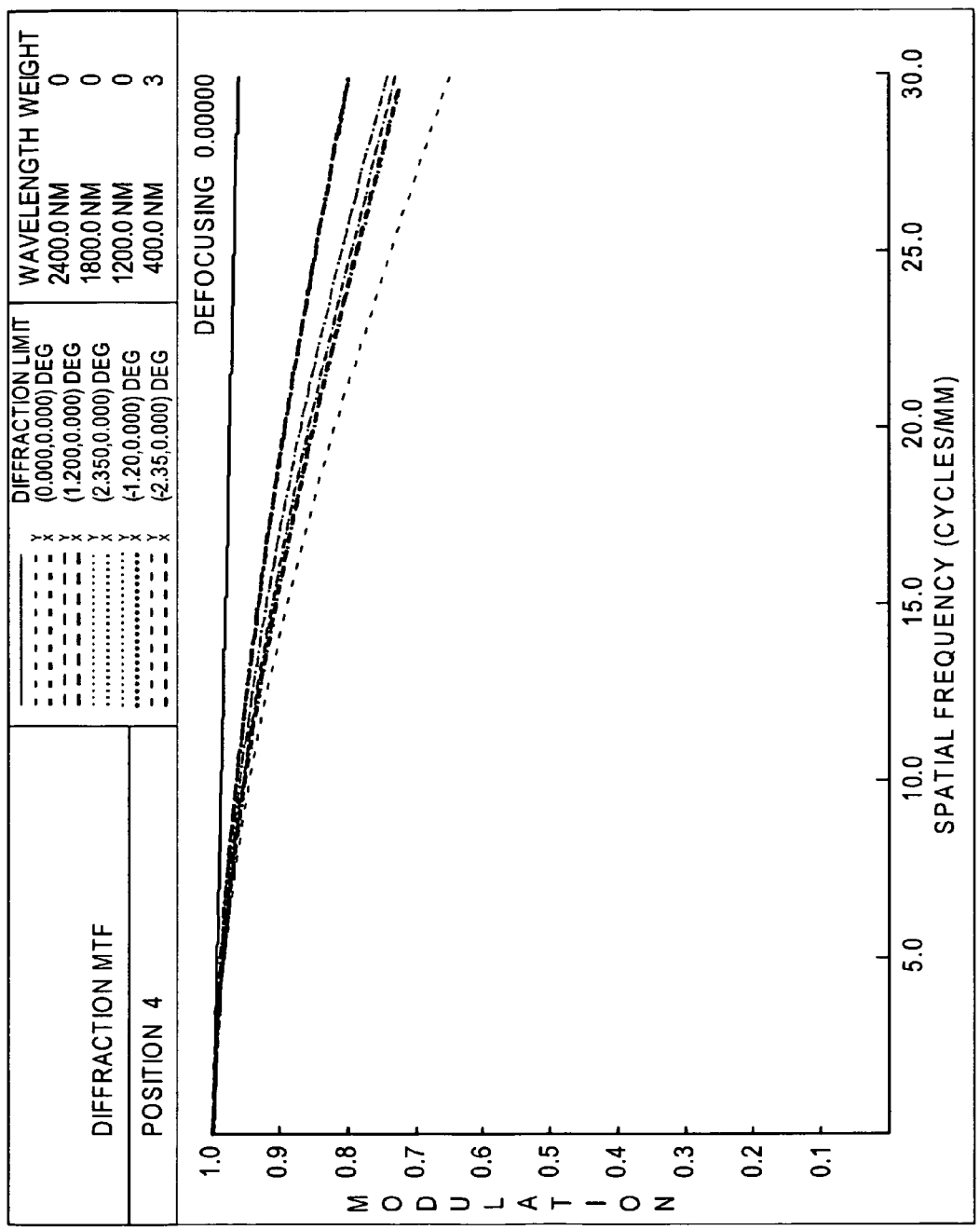

FIG. 14 shows a hyperspectral imaging system 510 wherein the system 410 of FIG. 13 is modified so that the common system axis C is thrice folded. FIG. 15 shows the system 510 as mounted and contained within a protective housing 540 as described further below. Components of the system 510 that are the same as or similar to those in the folded system 310 in FIG. 8, have corresponding reference numerals increased by 200.

In the system 510, the common system axis C is folded first by a mirror 502 disposed between tertiary mirror 526 of fore-optics 512 and aperture slit 514, a second time by a mirror 503 disposed between the slit 514 and primary mirror 530 of imaging spectrometer 516, and a third time by a mirror 504 disposed between tertiary mirror 534 of the imaging spectrometer and focal plane array 518. FIGS. 15A to 15F show a working prescription for the optical components of the imaging system 510.

EXAMPLE THREE

The systems 410 and 510 of FIGS. 13, 14 and 15, can meet the following specifications when constructed as described above. FIGS. 16, 17, 18 and 19 show modulation transfer functions (MTFs) calculated for either system at each of four different wavelengths of received light; namely, 2.4 µm, 1.8 µm, 1.2 µm and 0.4 µm.

| | |
|---|---|
| TMA (fore-optics 412 or 512) EFL: | 4.8 inches |
| FNO: | 2.5 |
| WL: | 0.4 µm to 2.4 µm |
| Detector (focal plane array 418 or 518): | 40 µm pixel, 256 × 210 pixels 0.4 inches spatial × 0.33 inches spectral |
| Spectral sampling: | 10 nm/pixel |

At Entrance Spectrometer (Slit 414 or 514):

| | |
|---|---|
| TMA ensquared energy for a 40 micron square: | 66% at .45 µm 66% at 1.0 µm 60% at 2.35 µm |

MTF Requirements:

|  | Wavelength (μm) | | |
| --- | --- | --- | --- |
| Frequency (cycles/mm) | 0.45 | 1.0 | 2.3 |
| 18.5 | 65 | 65 | 50 |
| 37.5 | 27 | 35 | 10 |

Smile, keystone < 0.1 pixel (4.0 μm)

Calculated Performance

| WL1 = 2.4 μm WL2 = 1.8 μm WL3 = 1.2 μm WL4 = 0.4 μm | |
| --- | --- |
| Smile in μm | Keystone in μm (relative to WL1) |
| WL1: −2.15514 | WL1: N/A |
| WL2: −2.01759 | WL2: −0.74321 |
| WL3: −1.90041 | WL3: −1.57073 |
| WL4: −1.76925 | WL4: −2.78092 |
| FNO: | 2.5 |
| Spatial field: | 0.4 inches |
| Spectral field: | 0.3307 inches |
| EFL cross field variation: | <0.3% |
| Telecentric | |

As mentioned, FIG. 15 shows the system 510 of FIG. 14 mounted within a casing or housing 540, and viewed from a direction opposite from the view of the system 510 in FIG. 14. An associated scanning mirror assembly 506 is also represented in FIG. 15, in optical alignment with the system fore-optics 512. The common system axis C passes through the vertices of the solid surfaces associated with the three fore-optics (TMA) mirrors 520, 524 and 526. Note the decentered entrance aperture and the field of view angle bias. Light from the tertiary fore-optics mirror 526 is reflected by the first folding mirror 502 so that the common system axis C is folded approximately 90 degrees, directed through the slit 514 and toward the second folding mirror 503. The second folding mirror 503 is disposed so that the system axis C is folded back approximately 90 degrees and passes through the vertices of the solid surfaces associated with the three imaging spectrometer mirrors 530, 532 and 534.

Each embodiment of the hyperspectral imaging system described herein is rotationally symmetric, and the optical components of the fore-optics and the imaging spectrometer in each embodiment share a defined common system axis. The fore-optics accepts electromagnetic radiation or light from distant objects, and forms a well-corrected intermediate image at an entrance spectrometer slit. Light exiting the slit is directed by a primary mirror of the imaging spectrometer to a diffraction grating at a secondary mirror of the spectrometer. Diffracted light from the grating is directed toward a tertiary spectrometer mirror which forms an image pattern on a focal plane array. The image pattern represents multiple spectral components of the intermediate image at the slit. Defined relationships between the optical powers of the fore-optics and the imaging spectrometer components, enable correction of spatial and spectral distortion as well as near diffraction-limited image quality.

The inventive system has a low F-number and a wide field of view. In the first embodiment of FIGS. 1 and 2, the F-number is 2.5, the spectral wavelength range is 0.4 to 2.4 microns, and the field is 0.68 inches spatial by 0.272 inches spectral. In the second, more compact embodiment of FIGS. 7 and 8, the F-number is 2.5, the spectral range is 0.4 to 2.4 microns, and the field is 0.272 inches spatial by 0.272 inches spectral. In the third embodiment of FIGS. 13, 14 and 15, all reflective surfaces are conics, the F-number is 2.5, the spectral range is 0.4 to 2.4 microns, and the field is 0.4 inches spatial×0.33 inches spectral. Compared to existing systems, the alignment and testing of the system is less laborious since its optical components are not highly sensitive to minor variations in their positions, thus making the system less costly and more reliable.

While the foregoing represents preferred embodiments of the invention, it will be understood by those skilled in the art that various modifications and changes may be made without departing from the spirit and scope of the invention, and that the invention includes all such modifications and changes as are within the bounds of the following claims.

We claim:

1. A hyperspectral imaging system, comprising:

a system housing;

fore-optics mounted in the housing and including a primary fore-optics mirror, a secondary fore-optics mirror and a tertiary fore-optics mirror each having an associated reflective surface, wherein the mirrors are configured so that electromagnetic radiation or light from a distant object is collected on the reflective surface of the primary mirror and directed toward the reflective surface of the secondary mirror, the secondary mirror directs the light toward the reflective surface of the tertiary mirror, and the tertiary mirror forms an intermediate image corresponding to the object at an entrance side of a spectrometer slit;

an imaging spectrometer mounted in the housing and including a primary spectrometer mirror, a secondary spectrometer mirror and a tertiary spectrometer mirror each of which has an associated reflective surface, wherein the primary spectrometer mirror is disposed in operative relation to an exit side of the spectrometer slit, and the secondary spectrometer mirror has an associated diffraction grating;

a focal plane array;

the primary, the secondary and the tertiary mirrors of the imaging spectrometer are configured so that light from the exit side of the spectrometer slit is received on the reflective surface of the primary spectrometer mirror and directed toward the diffraction grating of the secondary spectrometer mirror, diffracted light from the grating is received on the reflective surface of the tertiary spectrometer mirror, and the tertiary mirror forms a spectral image representing spectral components of the object on the focal plane array;

each of the reflective surfaces associated with the mirrors of the fore-optics and the mirrors of the imaging spectrometer is a segment of a solid surface which has a known geometrical axis of symmetry, the axes of symmetry associated with the reflective surfaces of the fore-optics mirrors coincide with one another to define a common geometrical axis of the fore-optics, and the axes of symmetry associated with the reflective surfaces of the imaging spectrometer mirrors coincide to define a common geometrical axis of the imaging spectrometer; and the fore-optics mirrors and the imaging spectrometer mirrors are disposed so that the common geometrical axis of the fore-optics and the common geometrical axis of the imaging spectrometer coincide with one another to define a common system axis for the reflective surfaces of the mirrors in the system.

2. An imaging system according to claim 1, wherein the common system axis is folded at one or more locations.

3. The imaging system of claim 1, wherein the fore-optics is in the form of a three-mirror anastigmat.

4. The imaging system of claim 1, wherein the fore-optics is telecentric.

5. The imaging system of claim 1, wherein the imaging spectrometer is doubly telecentric.

6. The imaging system of claim 1, wherein the intermediate image formed by the fore-optics is optically corrected for field curvature.

7. The imaging system of claim 1, wherein the intermediate image formed by the fore-optics is optically corrected for distortion.

8. The imaging system of claim 1, wherein the spectral image formed on the focal plane array is optically corrected for spatial and spectral distortion in smile and keystone.

9. The imaging system of claim 1, wherein one or more of the reflective surfaces of the fore-optics mirrors are segments of general aspheres.

10. The imaging system of claim 1, wherein one or more of the reflective surfaces of the fore-optics mirrors are segments of conical surfaces.

11. The imaging system of claim 1, wherein one or more of the reflective surfaces of the fore-optics mirrors are segments of spherical surfaces.

12. The imaging system of claim 1, wherein one or more of the reflective surfaces of the spectrometer mirrors are segments of general aspheres.

13. The imaging system of claim 1, wherein one or more of the reflective surfaces of the spectrometer mirrors are segments of conical surfaces.

14. The imaging system of claim 1, wherein one or more of the reflective surfaces of the spectrometer mirrors are segments of spherical surfaces.

15. The imaging system of claim 1, wherein the system is tilted about an axis parallel to a long dimension of the spectrometer slit.

16. The imaging system of claim 15, wherein a tilt of the system and decentration of an aperture defined by the reflective surface of the primary fore-optics mirror, are related as follows:

$$tg\theta \times \Delta_{S1} = 0.3 \text{ to } 1.20 \text{ inches}$$

$$\Delta_{S1}/EFL = 0.3 \text{ to } 0.68$$

wherein
$tg\theta$ is the tangent of the tilt of the imaging system,
$\Delta_{S1}$ is the decentration of the aperture, and
EFL is the effective focal length of the imaging system.

17. The imaging system of claim 1, wherein relations between constructive parameters of the fore-optics are as follows:

$$\Phi_1/\Phi_2 = (-0.15) \text{ to } (-0.35)$$

$$\Phi_1/\Phi_3 = 0.30 \text{ to } 0.55$$

$$D_1/EFL = 0.60 \text{ to } 0.75$$

$$D_2/EFL = 0.60 \text{ to } 0.75$$

wherein
$\Phi_1$, $\Phi_2$ and $\Phi_3$ are optical powers of the primary, the secondary and the tertiary fore-optics mirrors, correspondingly, and
$D_1$ and $D_2$ are distances, respectively, between vertices of the solid surfaces associated with the primary and the secondary fore-optics mirrors, and between vertices of the solid surfaces associated with the secondary and the tertiary fore-optics mirrors.

18. The imaging system of claim 1, wherein relations between constructive parameters of the imaging spectrometer are as follows:

$$\Phi_{1S}/\Phi_{2S} = (-0.50) \text{ to } (-0.80)$$

$$\Phi_{3S}/\Phi_{2S} = (-0.50) \text{ to } (-0.80)$$

$$(D_{1S} + R_{2S})/R_{1S} = 0.8 \text{ to } 1.7$$

wherein
$\Phi_{1S}$, $\Phi_{2S}$ and $\Phi_{3S}$ are optical powers of the primary, the secondary, and the tertiary mirrors of the spectrometer, correspondingly,
$D_{1S}$ is the distance between vertices of the solid surfaces associated with the primary and the secondary spectrometer mirrors,
$R_{2S}$ is the radius of the secondary mirror, and
$R_{1S}$ is the radius of the primary mirror.

19. The imaging system of claim 1, wherein the reflective surfaces of the fore-optics and the imaging spectrometer mirrors are segments of solid surface shapes, as follows:
primary fore-optics mirror: hyperboloidal;
secondary fore-optics mirror: oblique ellipsoidal;
tertiary fore-optics mirror: ellipsoidal;
primary spectrometer mirror: oblique ellipsoidal;
secondary spectrometer mirror: oblique ellipsoidal; and
tertiary spectrometer mirror: oblique ellipsoidal.

* * * * *